(12) United States Patent
Ito et al.

(10) Patent No.: US 8,299,179 B2
(45) Date of Patent: Oct. 30, 2012

(54) CONJUGATED DIENE-BASED POLYMER, CONJUGATED DIENE-BASED POLYMER COMPOSITION, AND PROCESS FOR PRODUCING CONJUGATED DIENE-BASED POLYMER

(75) Inventors: Mana Ito, Ichihara (JP); Katsunari Inagaki, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/206,171

(22) Filed: Aug. 9, 2011

(65) Prior Publication Data

US 2012/0041136 A1 Feb. 16, 2012

(30) Foreign Application Priority Data

Aug. 11, 2010 (JP) ................. 2010-180023

(51) Int. Cl.
*C08F 8/42* (2006.01)
*C08F 8/30* (2006.01)
*C08K 3/36* (2006.01)
*C08F 236/04* (2006.01)

(52) U.S. Cl. ..... 525/102; 525/103; 525/105; 525/326.5; 524/547; 526/338

(58) Field of Classification Search .................. 525/102, 525/103, 105, 326.5; 524/547; 526/338
See application file for complete search history.

(56) References Cited

U.S. PATENT DOCUMENTS

| | | | |
|---|---|---|---|
| 3,485,857 A | 12/1969 | Speier et al. | |
| 5,128,416 A | 7/1992 | Imai et al. | |
| 5,821,290 A * | 10/1998 | Labauze | 524/188 |
| 7,041,761 B2 * | 5/2006 | Halasa et al. | 526/279 |
| 2007/0088132 A1 * | 4/2007 | Taniguchi et al. | 525/342 |
| 2011/0275755 A1 * | 11/2011 | Oshima et al. | 524/548 |

FOREIGN PATENT DOCUMENTS

| | | |
|---|---|---|
| EP | 0270071 A2 | 6/1988 |
| EP | 0334042 A2 | 9/1989 |
| JP | 63-186748 A | 8/1988 |
| JP | 1217011 A | 8/1989 |
| JP | 07-082422 A | 3/1995 |

* cited by examiner

*Primary Examiner* — Fred M Teskin
(74) *Attorney, Agent, or Firm* — Sughrue Mion, PLLC

(57) ABSTRACT

Disclosed are a conjugated diene-based polymer from which a polymer composition excellent in fuel cost-saving properties and elongation at break can be obtained, a polymer composition containing the conjugated diene-based polymer and a reinforcing agent, and a process for producing the conjugated diene-based polymer. A conjugated diene-based polymer obtained by reacting one end of a polymer having a monomer unit based on a conjugated diene, a monomer unit based on a compound represented by the following formula (1), and a monomer unit based on a compound represented by the following formula (2) with an alkoxysilane compound.

$$V^1-S^1 \tag{1}$$

wherein $V^1$ represents a hydrocarbyl group having a polymerizable carbon-carbon double bond, and $S^1$ represents a substituted silyl group.

$$V^2-A^2 \tag{2}$$

wherein $V^2$ represents a hydrocarbyl group having a polymerizable carbon-carbon double bond, and $A^2$ represents a substituted amino group, or a nitrogen-containing heterocyclic group.

15 Claims, No Drawings

CONJUGATED DIENE-BASED POLYMER, CONJUGATED DIENE-BASED POLYMER COMPOSITION, AND PROCESS FOR PRODUCING CONJUGATED DIENE-BASED POLYMER

The present invention relates to a conjugated diene-based polymer, a conjugated diene-based polymer composition, and a process for producing a conjugated diene-based polymer.

BACKGROUND OF THE INVENTION

As a rubber composition for an automobile tire, a conjugated diene-based polymer such as polybutadiene or a butadiene-styrene copolymer, and a rubber composition containing a reinforcing agent are used.

In recent years, with increased concern about an environmental problem, requirements of fuel cost-saving properties on an automobile have been increasing, and a rubber composition used in a tire for an automobile has also been required to be excellent in fuel cost-saving properties.

For example, as a polymer enhancing fuel cost-saving properties, and a polymer composition good in fuel cost-saving properties, JP-A-63-186748 has proposed a polymer obtained by living anion-polymerizing butadiene and styrene using alkyllithium as a polymerization initiator and, then, modifying one end of the resulting polymer with a dialkyl amino group-containing alkoxysilane compound, and a polymer composition containing the polymer and a reinforcing agent. JP-A-1-217011 has proposed a conjugated diene-based polymer in which one end of a polymer obtained by copolymerizing butadiene and styrene using alkyllithium as a polymerization initiator is modified with bis(dimethylamino)methylvinylsilane, and a polymer composition of the polymer and reinforcing agent. JP-A-7-82422 has proposed a polymer obtained by living anion-polymerizing butadiene, styrene and (1-pyrrolidinyl)methylstyrene using alkyllithium as a polymerization initiator, and a polymer composition containing the polymer and a reinforcing agent.

SUMMARY OF THE INVENTION

However, a polymer composition using the conventional conjugated diene-based polymer was not necessarily sufficiently satisfactory in fuel cost-saving properties.

Under such circumstances, an object of the present invention is to provide a conjugated diene-based polymer from which a polymer composition excellent in fuel cost-saving properties and elongation at break can be obtained, a polymer composition containing the conjugated diene-based polymer and a reinforcing agent, and a process for producing the conjugated diene-based polymer.

A first aspect of the present invention relates to a conjugated diene-based polymer obtained by reacting one end of a conjugated diene-based polymer having a monomer unit based on a conjugated diene, a monomer unit based on a compound represented by the following formula (1), and a monomer unit based on a compound represented by the following formula (2) with an alkoxysilane compound.

wherein $V^1$ represents a hydrocarbyl group having a polymerizable carbon-carbon double bond, and $S^1$ represents a substituted silyl group.

(wherein $V^2$ represents a hydrocarbyl group having a polymerizable carbon-carbon double bond, and $A^2$ represents a substituted amino group, or a nitrogen-containing heterocyclic group.

A second aspect of the present invention relates to a conjugated diene-based polymer composition comprising the conjugated diene-based polymer and a reinforcing agent.

A third aspect of the present invention relates to a process for producing a conjugated diene-based polymer comprising the following step A and step B:

(Step A): a step of polymerizing a monomer component comprising a conjugated diene, a compound represented by the following formula (1) and a compound represented by the following formula (2) with an alkali metal catalyst in a hydrocarbon solvent to obtain a polymer having an alkali metal derived from the alkali metal catalyst on at least one end of a polymer chain having a monomer unit based on the conjugated diene, a monomer unit based on a compound represented by the following formula (1) and a monomer unit based on a compound represented by the following formula (2).

wherein $V^1$ represents a hydrocarbyl group having a polymerizable carbon-carbon double bond, and $S^1$ represents a substituted silyl group.

wherein $V^2$ represents a hydrocarbyl group having a polymerizable carbon-carbon double bond, and $A^2$ represents a substituted amino group, or a nitrogen-containing heterocyclic group.

(Step B): a step of reacting the polymer obtained in step A with an alkoxysilane compound.

According to the present invention, there can be provided a conjugated diene-based polymer from which a polymer composition excellent in fuel cost-saving properties and elongation at break can be obtained, a polymer composition containing the conjugated diene-based polymer and a reinforcing agent, and a process for producing the conjugated diene-based polymer.

DETAILED DESCRIPTION OF THE INVENTION

The conjugated diene-based polymer of the present invention is a conjugated dine-based polymer obtained by reacting one end of a polymer having a monomer unit based on a conjugated diene, a monomer unit based on a compound represented by the following formula (1), and a monomer unit based on a compound represented by the following formula (2) with an alkoxysilane compound.

wherein $V^1$ represents a hydrocarbyl group having a polymerizable carbon-carbon double bond, and $S^1$ is a substituted silyl group.

wherein $V^2$ represents a hydrocarbyl group having a polymerizable carbon-carbon double bond, and $A^2$ represents a substituted amino group, or a nitrogen-containing heterocyclic group.

Herein, the hydrocarbyl group represents a hydrocarbon residue. The hydrocarbylene group represents a divalent hydrocarbon residue. The nitrogen-containing heterocyclic group represents a group obtained by removing one hydrogen atom from a carbon atom of a heterocyclic ring of a compound having a nitrogen-containing hetrocyclic ring, and the nitrogen-containing heterocyclic ring represents a heterocyclic ring having a nitrogen atom as a hetero atom constituting a ring.

Examples of the conjugated diene include 1,3-butadiene, isoprene, 1,3-pentadiene, 2,3-dimethyl-1,3-butadiene, and 1,3-hexadiene, and one or more kinds of them are used. The conjugated diene is preferably 1,3-butadiene, or isoprene.

$V^1$ in the formula (1) represents a hydrocarbyl group having a polymerizable carbon-carbon double bond.

$V^1$ is preferably a group represented by the following formula (1-V).

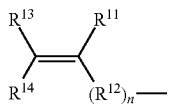

(1-V)

wherein n is an integer of 0 or 1, $R^{11}$, $R^{13}$ and $R^{14}$ each represent independently a hydrogen atom or a hydrocarbyl group, and $R^{12}$ represents a hydrocarbylene group.)

In the formula (1-V), n represents 0 or 1.

Examples of the hydrocarbyl group of $R^{11}$, $R^{13}$ and $R^{14}$ include an alkyl group, an alkenyl group, and an aryl group. Examples of the alkyl group include a methyl group, an ethyl group, a n-propyl group, an isopropyl group, a n-butyl group, a sec-butyl group, and a tert-butyl group, preferably a methyl group. Examples of the alkenyl group include a vinyl group, an allyl group, a 1-propenyl group, and a 1-methylethenyl group, preferably a vinyl group. Examples of the aryl group include a phenyl group, a methylphenyl group, and an ethylphenyl group, preferably a phenyl group.

$R^{11}$, $R^{13}$ and $R^{14}$ are preferably a hydrogen atom, a methyl group, a vinyl group, or a phenyl group, more preferably a hydrogen atom.

Examples of the hydrocarbylene group of $R^{12}$ include an alkylene group, an arylene group, and a group in which an arylene group and an alkylene group are bonded.

Examples of the alkylene group include a methylene group, an ethylene group, and a trimethylene group. Preferable is a methylene group or an ethylene group. Examples of the arylene group include a phenylene group, a naphthylene group, and a biphenylene group. Preferable is a phenylene group.

Examples of the group in which an arylene group and an alkylene group are bonded include a group in which a phenylene group and an alkylene group are bonded, a group in which a naphthylene group and an alkylene group are bonded, and a group in which a biphenylene group and an alkylene group are bonded.

In addition, it is preferable that the group in which an arylene group and an alkylene group are bonded is such that a carbon atom of an arylene group of the group is bonded to a carbon atom to which $R^{11}$ in the formula (1-V) is bonded.

Examples of a group in which a phenylene group and an alkylene group are bonded (phenylene-alkylene group (e.g. a group represented by the following formula (1-R))) include a para-phenylene-alkylene group (e.g. a group represented by the following formula (1-Ra)), a meta-phenylene-alkylene group (e.g. a group represented by the following formula (1-Rb)), and an ortho-phenylene-alkylene group (e.g. a group represented by the following formula (1-Rc)).

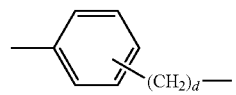

(1-R)

wherein d represents an integer of 1 to 10, and $(CH_2)_d$ is a substituent on a benzene ring.

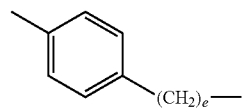

(1-Ra)

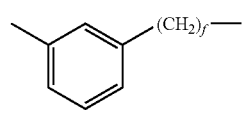

(1-Rb)

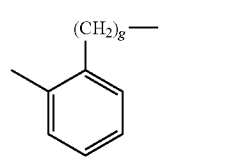

(1-Rc)

wherein e, f and g represent an integer of 1 to 10, respectively.

The group in which an arylene group and an alkylene group are bonded (phenylene-alkylene group) is preferably a group in which a phenylene group and an alkylene group are bonded, more preferably a group represented by the above formula (1-Ra), or a group represented by the above formula (1-Rb), further preferably a para-phenylene-methylene group (a group represented by the formula (1-Ra) in which e=1), a meta-phenylene-methylene group (a group represented by the formula (1-Rb) in which f=1), a para-phenylene-ethylene group (a group represented by the formula (1-Ra) in which e=2), or a meta-phenylene-ethylene group (a group represented by the formula (1-Rb) in which f=2).

Examples of the group represented by the formula (1-V) include the following groups.

Examples of a group in which $R^{11}$, $R^{13}$ and $R^{14}$ are each a hydrogen atom include a vinyl group, a vinylmethyl group, a vinylethyl group, a 4-vinylphenyl group, a 3-vinylphenyl group, a (4-vinylphenyl)methyl group, a 2-(4-vinylphenyl)ethyl group, a (3-vinylphenyl)methyl group, and a 2-(3-vinylphenyl)ethyl group.

Examples of a group in which $R^{11}$ is a methyl group, and $R^{13}$ and $R^{14}$ are each a hydrogen atom include an isopropenyl group, a methallyl group, a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group, and a 2-(3-isopropenylphenyl)ethyl group.

Examples of a group in which $R^{11}$ is a vinyl group, and $R^{13}$ and $R^{14}$ are each a hydrogen atom include a 1-methylene-2-propenyl group, and a 2-methylene-3-butenyl group.

Examples of a group in which $R^{11}$ is a phenyl group, and $R^{13}$ and $R^{14}$ are each a hydrogen atom include a 4-(1-phenylvinyl)phenyl group, a 3-(1-phenylvinyl)phenyl group, and a 2-(1-phenylvinyl)phenyl group.

Examples of a group in which $R^{11}$ is a hydrogen atom, $R^{13}$ is a methyl group, and $R^{14}$ is a hydrogen atom include 1-propenyl group, a crotyl group, a 4-(1-propenyl)phenyl group, a 4-(1-propenyl)phenylmethyl group, a 2-{4-(1-propenyl)phenyl}ethyl group, a 3-(1-propenyl)phenyl group, a 3-(1-propenyl)phenylmethyl group, and a 2-{3-(1-propenyl)phenyl}ethyl group.

The group represented by the formula (1-V) is preferably a group represented by the following formula (1-V1).

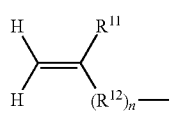

(1-V1)

wherein $R^{11}$ represents a hydrogen atom or a hydrocarbyl group, n is an integer of 0 or 1, and $R^{12}$ is a hydrocarbylene group.

The group represented by the formula (1-V1) is, preferably, as a group in which $R^{11}$ is a hydrogen atom, a vinyl group, a 4-vinylphenyl group, a 3-vinylphenyl group, a (4-vinylphenyl)methyl group, a 2-(4-vinylphenyl)ethyl group, a (3-vinylphenyl)methyl group, or a 2-(3-vinylphenyl)ethyl group; as a group in which $R^{11}$ is a methyl group, a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group, or a 2-(3-isopropenylphenyl)ethyl group; as a group in which $R^{11}$ is a vinyl group, a 1-methylene-2-propenyl group, or a 2-methylene-3-butenyl group; as a group in which $R^{11}$ is a phenyl group, a 4-(1-phenylvinyl)phenyl group.

The group represented by the formula (1-V1) is further preferably a vinyl group.

$S^1$ in the formula (1) represents a substituted silyl group.

Examples of the substituted silyl group represented by $S^1$ include a silyl group in which hydrogen atom(s) bonded to a silicon atom is (are) substituted with a substituent such as a hydrocarbyl group optionally having a substituent, a hydrocarbyloxy group, or a substituted amino group. Substituents bonded to a silicon atom may be the same or different.

The substituted silyl group represented by $S^1$ is preferably a group represented by the following formula (1-S).

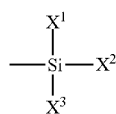

(1-S)

wherein $X^1$, $X^2$ and $X^3$ each represent independently a substituted amino group, or a hydrocarbyl group optionally having a substituent, wherein at least one of $X^1$, $X^2$ and $X^3$ is a substituted amino group.

Examples of the hydrocarbyl group optionally having a substituent of $X^1$, $X^2$ and $X^3$ include hydrocarbyl groups optionally having an oxygen atom, a nitrogen atom and a silicon atom.

Examples of the hydrocarbyl group of $X^1$, $X^2$ and $X^3$ include an alkyl group, an alkenyl group, an alkynyl group, an aryl group, and an aralkyl group. Examples of the alkyl group include a methyl group, an ethyl group, a n-propyl group, an isopropyl group, a n-butyl group, a sec-butyl group, and a tert-butyl group. Examples of the alkenyl group include a vinyl group, an allyl group, a 1-propenyl group, and a 1-methylethenyl group. Examples of the alkynyl group include an ethynyl group, and a propargyl group. Examples of the aryl group include a phenyl group, a tolyl group, and a xylyl group. Examples of the aralkyl group include a benzyl group. Examples of the hydrocarbyl group preferably include an alkyl group.

Examples of the hydrocarbyl group having an oxygen atom of $X^1$, $X^2$ and $X^3$ include alkoxyalkyl groups such as a methoxymethyl group, a methoxyethyl group, an ethoxymethyl group, and an ethoxyethyl group.

Examples of the hydrocarbyl group having a nitrogen atom of $X^1$, $X^2$ and $X^3$ include dialkylaminoalkyl groups such as a dimethylaminomethyl group, a dimethylaminoethyl group, a diethylaminomethyl group, and a diethylaminoethyl group.

Examples of the hydrocarbyl group having a silicon atom of $X^1$, $X^2$ and $X^3$ include trialkylsilylalkyl groups such as a trimethylsilylmethyl group, a trimethylsilylethyl group, a triethylsilylmethyl group, and a triethylsilylethyl group.

The hydrocarbyl group optionally having a substituent of $X^1$, $X^2$ and $X^3$ has preferably 1 to 10, more preferably 1 to 4 carbon atoms.

The hydrocarbyl group optionally having a substituent of $X^1$, $X^2$ and $X^3$ is preferably an alkyl group or an alkoxyalkyl group. The alkyl group is preferably an alkyl group having 1 to 4 carbon atoms, more preferably a methyl group or an ethyl group. The alkoxyalkyl group is preferably an alkoxyalkyl group having 2 to 4 carbon atoms.

The substituted amino group of $X^1$, $X^2$ and $X^3$ is preferably a group represented by the following formula (1-X).

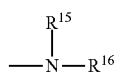

(1-X)

wherein $R^{15}$ and $R^{16}$ each represent a hydrocarbyl group, or a trihydrocarbylsilyl group, or $R^{15}$ and $R^{16}$ are bonded to represent a hydrocarbylene group optionally having a nitrogen atom and/or an oxygen atom as a hetero atom, or $R^{15}$ and $R^{16}$ are one group, and represent a group which bonds to a nitrogen atom with a double bond.

Examples of the hydrocarbyl group of $R^{15}$ and $R^{16}$ include an alkyl group, an alkenyl group, an alkynyl group, an aryl group, and an aralkyl group. Examples of the alkyl group include a methyl group, an ethyl group, a n-propyl group, an isopropyl group, a n-butyl group, a sec-butyl group, and a tert-butyl group. Examples of the alkenyl group include a vinyl group, an allyl group, a 1-propenyl group, and a 1-methylethenyl group. Examples of the alkynyl group include an ethynyl group, and a propargyl group. Examples of the aryl group include a phenyl group, a tolyl group, and a xylyl group. Examples of the aralkyl group include a benzyl group.

The hydrocarbyl group of $R^{15}$ and $R^{16}$ has preferably 1 to 10, more preferably 1 to 4, further preferably 1 to 2 carbon atoms.

The hydrocarbyl group of $R^{15}$ and $R^{16}$ is preferably an alkyl group, more preferably a linear alkyl group.

Examples of the trihydrocarbylsilyl group of $R^{15}$ and $R^{16}$ include trialkylsilyl groups such as a trimethylsilyl group, a triethylsilyl group, a triisopropylsilyl group, and a tert-butyldimethylsilyl group.

The trihydrocarbylsilyl group of $R^{15}$ and $R^{16}$ is preferably a trialkylsilyl group having 3 to 9 carbon atoms, more preferably a trialkylsilyl group in which an alkyl group bonded to a silicon atom is an alkyl group having 1 to 3 carbon atoms, further preferably a trimethylsilyl group.

Examples of the hydrocarbylene group optionally having a nitrogen atom and/or an oxygen atom as a hetero atom in which $R^{15}$ and $R^{16}$ are bonded include a hydrocarbylene group, a hydrocarbylene group having a nitrogen atom, and a hydrocarbylene group having an oxygen atom. Examples of the hydrocarbylene group include alkylene groups such as an ethylene group, a trimethylene group, a tetramethylene group, a pentamethylene group, and a hexamethylene group. Examples of the hydrocarbylene group having a nitrogen atom include a group represented by —$CH_2CH_2$—NH—$CH_2$—, a group represented by —$CH_2CH_2$—N=CH—, a group represented by —CH=CH—N=CH—, and a group represented by —$CH_2CH_2$—NH—$CH_2CH_2$—. Examples of the hydrocarbylene group having an oxygen atom include a group represented by —$CH_2CH_2$—O—$CH_2CH_2$—.

The group in which $R^{15}$ and $R^{16}$ are bonded has preferably 2 to 20, more preferably 2 to 7, further preferably 4 to 6 carbon atoms.

The hydrocarbylene group optionally having a nitrogen atom and/or an oxygen atom as a hetero atom in which $R^{15}$ and $R^{16}$ are bonded is preferably a hydrocarbylene group, more preferably an alkylene group, further preferably a polymethylene group.

Examples of one group in which $R^{15}$ and $R^{16}$ bond to a nitrogen atom with a double bond include hydrocarbylidene groups such as an ethylidene group, a propylidene group, a butylidene group, a 1-methylethylidene group, a 1-methylpropylidene group, and a 1,3-dimethylbutylidene group.

The one group in which $R^{15}$ and $R^{16}$ bond to a nitrogen atom with a double bond has preferably 2 to 20, more preferably 2 to 6 carbon atoms.

$R^{15}$ and $R^{16}$ are preferably an alkyl group, a trialkylsilyl group, or an alkylene group in which $R^{15}$ and $R^{16}$ are bonded, more preferably an alkyl group.

Examples of the group represented by the formula (1-X) include a non-cyclic amino group, and a cyclic amino group.

Examples of the non-cyclic amino group include a dialkylamino group, and a bis(trialkylsilyl)amino group. Examples of the dialkylamino group include a dimethylamino group, a diethylamino group, a di(n-propyl)amino group, a di(isopropyl)amino group, a di(n-butyl)amino group, a di(sec-butyl)amino group, a di(tert-butyl)amino group, and an ethylmethylamino group. Examples of the bis(trialkylsilyl)amino group include a bis(trimethylsilyl)amino group, and a bis(t-butyldimethylsilyl)amino group.

Examples of the non-cyclic amino group include an ethylideneamino group, a 1-methylpropylideneamino group, a 1,3-dimethylbutylideneamino group, a 1-methylethylideneamino group, and a 4-N,N-dimethylaminobenzylideneamino group.

Examples of the cyclic amino group include 1-polymethyleneimino groups such as a 1-aziridinyl group, a 1-azetidinyl group, a 1-pyrrolidinyl group, a 1-piperidinyl group, a 1-hexamethyleneimino group, a 1-heptamethyleneimino group, a 1-octamethyleneimino group, a 1-decamethyleneimino group, and a 1-dodecamethyleneimino group. In addition, examples thereof include a 1-pyrrolyl group, a 1-pyrazolidinyl group, a 1-imidazolidinyl group, a 1-pyrazolyl group, a 1-imidazolyl group, a 4,5-dihydro-1-imidazolyl group, a 1-piperazinyl group, and a morpholino group.

The group represented by the formula (1-X) is preferably a non-cyclic amino group, more preferably a dialkylamino group. The dialkylamino group is preferably a dimethylamino group, a diethylamino group, a di(n-propyl)amino group, or a di(n-butyl)amino group, more preferably a dimethylamino group, or a diethylamino group.

At least one of $X^1$, $X^2$ and $X^3$ in the formula (1-S) is a substituted amino group, preferably two or more of $X^1$, $X^2$ and $X^3$ are substituted amino groups, more preferably, two of $X^1$, $X^2$ and $X^3$ are substituted amino groups.

As the compound represented by the formula (1), examples of a compound in which $V^1$ represents a group represented by the formula (1-V1), $S^1$ is a group represented by the formula (1-S), $R^{11}$ in the formula (1-V1) is a hydrogen atom, and one of $X^1$, $X^2$ and $X^3$ in the formula (1-S) is a dialkylamino group include the following compounds.

Compounds in which n in the formula (1-V1) is 0:
(dimethylamino)dimethylvinylsilane,
(diethylamino)dimethylvinylsilane,
(di-n-propylamino)dimethylvinylsilane,
(di-n-butylamino)dimethylvinylsilane,
(dimethylamino)diethylvinylsilane,
(diethylamino)diethylvinylsilane,
(di-n-propylamino)diethylvinylsilane,
(di-n-butylamino)diethylvinylsilane.

Compounds in which n in the formula (1-V1) is 1:
(dimethylamino)dimethyl-4-vinylphenylsilane,
(dimethylamino)dimethyl-3-vinylphenylsilane,
(diethylamino)dimethyl-4-vinylphenylsilane,
(diethylamino)dimethyl-3-vinylphenylsilane,
(di-n-propylamino)dimethyl-4-vinylphenylsilane,
(di-n-propylamino)dimethyl-3-vinylphenylsilane,
(di-n-butylamino)dimethyl-4-vinylphenylsilane,
(di-n-butylamino)dimethyl-3-vinylphenylsilane,
(dimethylamino)diethyl-4-vinylphenylsilane,
(dimethylamino)diethyl-3-vinylphenylsilane,
(diethylamino)diethyl-4-vinylphenylsilane,
(diethylamino)diethyl-3-vinylphenylsilane,
(di-n-propylamino)diethyl-4-vinylphenylsilane,
(di-n-propylamino)diethyl-3-vinylphenylsilane,
(di-n-butylamino)diethyl-4-vinylsilane,
(di-n-butylamino)diethyl-3-vinylphenylsilane.

As the compound represented by the formula (1), examples of a compound in which $V^1$ is a group represented by the formula (1-V1), $S^1$ is a group represented by the formula (1-S), $R^{11}$ in the formula (1-V1) is a hydrogen atom, and two of $X^1$, $X^2$ and $X^3$ in the formula (1-S) are a dialkylamino group include the following compounds.

Compounds in which n in the formula (1-V1) is 0:
bis(dimethylamino)methylvinylsilane,
bis(diethylamino)methylvinylsilane,
bis(di-n-propylamino)methylvinylsilane,
bis(di-n-butylamino)methylvinylsilane,
bis(dimethylamino)ethylvinylsilane,
bis(diethylamino)ethylvinylsilane,
bis(di-n-propylamino)ethylvinylsilane,
bis(di-n-butylamino)ethylvinylsilane.

Compounds in which n in the formula (1-V1) is 1:
bis(dimethylamino)methyl-4-vinylphenylsilane,
bis(dimethylamino)methyl-3-vinylphenylsilane,
bis(diethylamino)methyl-4-vinylphenylsilane,
bis(diethylamino)methyl-3-vinylphenylsilane,
bis(di-n-propylamino)methyl-4-vinylphenylsilane,
bis(di-n-propylamino)methyl-3-vinylphenylsilane,
bis(di-n-butylamino)methyl-4-vinylphenylsilane,
bis(di-n-butylamino)methyl-3-vinylphenylsilane,
bis(dimethylamino)ethyl-4-vinylphenylsilane,
bis(dimethylamino)ethyl-3-vinylphenylsilane,
bis(diethylamino)ethyl-4-vinylphenylsilane,
bis(diethylamino)ethyl-3-vinylphenylsilane,
bis(di-n-propylamino)ethyl-4-vinylphenylsilane,
bis(di-n-propylamino)ethyl-3-vinylphenylsilane,
bis(di-n-butylamino)ethyl-4-vinylphenylsilane,
bis(di-n-butylamino)ethyl-3-vinylphenylsilane.

As the compound represented by the formula (1), examples of a compound in which $V^1$ is a group represented by the formula (1-V1), $S^1$ is a group represented by the formula (1-S), $R^{11}$ in the formula (1-V1) is a methyl group, and two of $X^1$, $X^2$ and $X^3$ in the formula (1-S) are a dialkylamino group include the following compounds.
Compounds in which n in the formula (1-V1) is 1:
bis(dimethylamino)methyl-4-isopropenylphenylsilane,
bis(dimethylamino)methyl-3-isopropenylphenylsilane,
bis(diethylamino)methyl-4-isopropenylphenylsilane,
bis(diethylamino)methyl-3-isopropenylphenylsilane,
bis(di-n-propylamino)methyl-4-isopropenylphenylsilane,
bis(di-n-propylamino)methyl-3-isopropenylphenylsilane,
bis(di-n-butylamino)methyl-4-isopropenylphenylsilane,
bis(di-n-butylamino)methyl-3-isopropenylphenylsilane,
bis(dimethylamino)ethyl-4-isopropenylphenylsilane,
bis(dimethylamino)ethyl-3-isopropenylphenylsilane,
bis(diethylamino)ethyl-4-isopropenylphenylsilane,
bis(diethylamino)ethyl-3-isopropenylphenylsilane,
bis(di-n-propylamino)ethyl-4-isopropenylphenylsilane,
bis(di-n-propylamino)ethyl-3-isopropenylphenylsilane,
bis(di-n-butylamino)ethyl-4-isopropenylphenysilane,
bis(di-n-butylamino)ethyl-3-isopropenylphenylsilane.

As the compound represented by the formula (1), examples of a compound in which $V^1$ is a group represented by the formula (1-V1), $S^1$ is a group represented by the formula (1-S), $R^{11}$ in the formula (1-V1) is a vinyl group, and two of $X^1$, $X^2$ and $X^3$ in the formula (1-S) are a dialkylamino group include the following compounds.
Compounds in which n in the formula (1-V1) is 0:
bis(dimethylamino)methyl(1-methylene-2-propenyl)silane,
bis(diethylamino)methyl(1-methylene-2-propenyl)silane,
bis(di-n-propylamino)methyl(1-methylene-2-propenyl)silane,
bis(di-n-butylamino)methyl(1-methylene-2-propenyl)silane,
bis(dimethylamino)ethyl(1-methylene-2-propenyl)silane,
bis(diethylamino)ethyl(1-methylene-2-propenyl)silane,
bis(di-n-propylamino)ethyl(1-methylene-2-propenyl)silane,
bis(di-n-butylamino)ethyl(1-methylene-2-propenyl)silane.

As the compound represented by the formula (1), examples of a compound in which $V^1$ is a group represented by the formula (1-V1), $S^1$ is a group represented by the formula (1-S), $R^{11}$ in the formula (1-V1) is a phenyl group, and two of $X^1$, $X^2$ and $X^3$ in the formula (1-S) are a dialkylamino group include the following compounds.
Compounds in which n in the formula (1-V1) is 1:
1-[4-bis(dimethylamino)methylsilyl]-1-phenylethylene,
1-[4-bis(diethylamino)methylsilyl]-1-phenylethylene,
1-[4-bis(di-n-propylamino)methylsilyl]-1-phenylethylene,
1-[4-bis(di-n-butylamino)methylsilyl]-1-phenylethylene,
1-[4-bis(dimethylamino)ethylsilyl]-1-phenylethylene,
1-[4-bis(diethylamino)ethylsilyl]-1-pheynylethylene,
1-[4-bis(di-n-propylamino)ethylsilyl]-1-phenylethylene,
1-[4-bis(di-n-butylamino)ethylsilyl]-1-phenylethylene.

As the compound represented by the formula (1), examples of a compound in which $V^1$ is a group represented by the formula (1-V1), $S^1$ is a group represented by the formula (1-S), Ru in the formula (1-V1) is a hydrogen atom, and three of $X^1$, $X^2$ and $X^3$ in the formula (1-S) are a dialkylamino group include the following compounds.
Compounds in which n in the formula (1-V1) is 0:
tris(dimethylamino)vinylsilane,
tris(diethylamino)vinylsilane,
tris(di-n-propylamino)vinylsilane,
tris(di-n-butylamino)vinylsilane.
Compounds in which n in the formula (1-V1) is 1:
tris(dimethylamino)-4-vinylphenylsilane,
tris(dimethylamino)-3-vinylphenylsilane,
tris(diethylamino)-4-vinylphenylsilane,
tris(diethylamino)-3-vinylphenylsilane,
tris(di-n-propylamino)-4-vinylphenylsilane,
tris(di-n-propylamino)-3-vinylphenylsilane,
tris(di-n-butylamino)-4-vinylphenylsilane,
tris(di-n-butylamino)-3-vinylphenylsilane.

As the compound represented by the formula (1), examples of a compound in which $V^1$ is a group represented by the formula (1-V1), $S^1$ is a group represented by the formula (1-S), $R^{11}$ in the formula (1-V1) is a methyl group, and three of $X^1$, $X^2$ and $X^3$ in the formula (1-S) are a dialkylamino group include the following compounds.
Compounds in which n in the formula (1-V1) is 1:
tris(dimethylamino)-4-isopropenylphenylsilane,
tris(dimethylamino)-3-isopropenylphenylsilane,
tris(diethylamino)-4-isopropenylphenylsilane,
tris(diethylamino)-3-isopropenylphenylsilane,
tris(di-n-propylamino)-4-isopropenylphenylsilane,
tris(di-n-propylamino)-3-isopropenylphenylsilane,
tris(di-n-butylamino)-4-isopropenylphenylsilane,
tris(di-n-butylamino)-3-isopropenylphenylsilane.

As the compound represented by the formula (1), examples of a compound in which $V^1$ is a group represented by the formula (1-V1), $S^1$ is a group represented by the formula (1-S), Ru in the formula (1-V1) is a vinyl group, and three of $X^1$, $X^2$ and $X^3$ in the formula (1-S) are a dialkylamino group include the following compounds.
Compounds in which n in the formula (1-V1) is 0:
tris(dimethylamino)(1-methylene-2-propenyl)silane,
tris(diethylamino)(1-methylene-2-propenyl)silane,
tris(di-n-propylamino)(1-methylene-2-propenyl)silane,
tris(di-n-butylamino)(1-methylene-2-propenyl)silane.

As the compound represented by the formula (1), examples of a compound in which $V^1$ is a group represented by the formula (1-V1), $S^1$ is a group represented by the formula (1-S), Ru in the formula (1-V1) is a phenyl group, and three of $X^1$, $X^2$ and $X^3$ in the formula (1-S) are a dialkylamino group include the following compounds.
Compounds in which n in the formula (1-V1) is 1:
1-[4-tris(dimethylamino)silyl]-1-phenylethylene,
1-[4-tris(diethylamino) silyl]-1-phenylethylene,
1-[4-tris(di-n-propylamino)methylsilyl]-1-phenylethylene,
1-[4-tris(di-n-butylamino)methylsilyl]-1-phenylethylene.

The compound represented by the formula (1) is preferably a compound in which $V^1$ is a group represented by the formula (1-V1), and $S^1$ is a group represented by the formula (1-S), more preferably a compound in which two of $X^1$, $X^2$ and $X^3$ in the formula (1-S) are a dialkylamino group, further preferably a compound in which $R^{11}$ in the formula (1-V1) is a hydrogen atom, and n in the formula (1-V1) is 0. Further preferable is a compound in which remaining one of $X^1$, $X^2$ and $X^3$ is an alkyl group or an alkoxyalkyl group. Most preferable are
bis(dimethylamino)methylvinylsilane,
bis(diethylamino)methylvinylsilane,
bis(di-n-propylamino)methylvinylsilane,
bis(di-n-butylamino)methylvinylsilane,
bis(dimethylamino)ethylvinylsilane,
bis(diethylamino)ethylvinylsilane,
bis(di-n-propylamino)ethylvinylsilane,
bis(di-n-butylamino)ethylvinylsilane.

$V^2$ in the formula (2) represents a hydrocarbyl group having a polymerizable carbon-carbon double bond.

$V^2$ is preferably a group represented by the following formula (2-V).

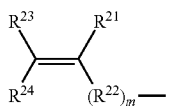
(2-V)

wherein m is 0 or 1, $R^{21}$, $R^{23}$ and $R^{24}$ each represent independently a hydrogen atom or a hydrocarbyl group and $R^{22}$ represents a hydrocarbylene group.

In the formula (2-V), m represents an integer of 0 or 1.

Examples of the hydrocarbyl group of $R^{21}$, $R^{23}$ and $R^{24}$ include an alkyl group, an alkenyl group, and an aryl group. Examples of the alkyl group include a methyl group, an ethyl group, a n-propyl group, an isopropyl group, a n-butyl group, a sec-butyl group, and a tert-butyl group, preferably a methyl group. Examples of the alkenyl group include a vinyl group, an allyl group, a 1-propenyl group, and a 1-methylethenyl group, preferably a vinyl group. Examples of the aryl group include a phenyl group, a methylphenyl group, and an ethylphenyl group, preferably a phenyl group.

$R^{21}$, $R^{23}$ and $R^{24}$ are preferably a hydrogen atom, a methyl group, a vinyl group, or a phenyl group, more preferably a hydrogen atom.

Examples of the hydrocarbylene group of $R^{22}$ include an alkylene group, an arylene group, and a group in which an arylene group and an alkylene group are bonded.

Examples of the alkylene group include a methylene group, an ethylene group, and a trimethylene group. Preferable is a methylene group or an ethylene group. Examples of the arylene group include a phenylene group, a naphthylene group, and a biphenylene group. Preferable is a phenylene group. More preferable is para-phenylene group, or a meta-phenylene group.

Examples of the group in which an arylene group and an alkylene group are bonded include a group in which a phenylene group and an alkylene group are bonded, a group in which a naphthylene group and an alkylene group are bonded, and a group in which a biphenylene group and an alkylene group are bonded.

In addition, it is preferable that the group in which an arylene group and an alkylene group are bonded is such that a carbon atom of an arylene group of the group is bonded to a carbon atom to which $R^{21}$ in the formula (2-V) is bonded.

Examples of the group in which a phenylene group and an alkylene group are bonded (phenylene-alkylene group (e.g. a group represented by the following formula (2-R))) include a para-phenylene-alkylene group (e.g. a group represented by the following formula (2-Ra)), a meta-phenylene-alkylene group (e.g. a group represented by the following formula (2-Rb)), and an ortho-phenylene-alkylene group (e.g. a group represented by the following formula (2-Rc)).

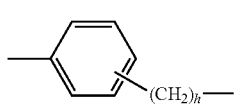
(2-R)

wherein h represents an integer of 1 to 10, and $(CH_2)_h$ is a substituent on a benzene ring.

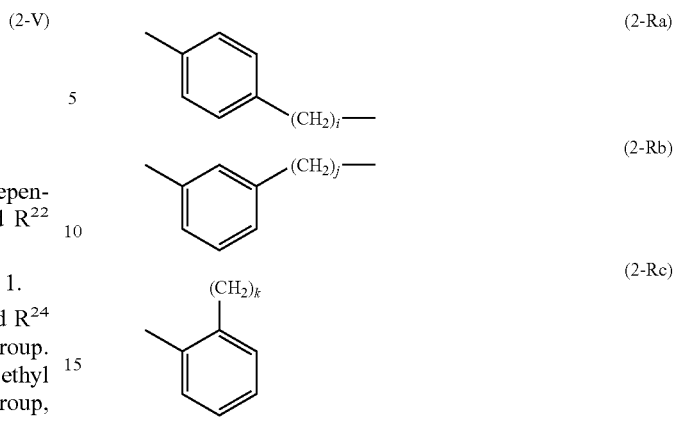
(2-Ra)

(2-Rb)

(2-Rc)

(wherein i, j and k represent an integer of 1 to 10, respectively.

In addition, h in the formula (2-R), i in the formula (2-Ra), j in the formula (2-Rb), and k in the formula (2-Rc) are preferably 1 to 5, more preferably 1 to 2, further preferably 1.

The group in which an arylene group and an alkylene group are bonded (phenylene-alkylene group) is preferably a group in which a phenylene group and an alkylene group are bonded, more preferably a group represented by the above formula (2-Ra) or a group represented by the above formula (2-Rb), further preferably a para-phenylene-methylene group (a group represented by the formula (2-Ra) in which i=1), a meta-phenylene-methylene group (a group represented by the formula (2-Rb) in which j=1), a para-phenylene-ethylene group (a group represented by the formula (2-Ra) in which i=2), or a meta-phenylene-ethylene group (a group represented by the formula (2-Rb) in which j=2), particularly preferably a para-phenylene-methylene group (a group represented by the formula (2-Ra) in which i=1), or a meta-phenylene-methylene group (a group represented by the formula (2-Rb) in which j=1).

Examples of the group represented by the formula (2-V) include the following groups.

Examples of a group in which $R^{21}$, $R^{23}$ and $R^{24}$ are each a hydrogen atom include a vinyl group, a vinylmethyl group, a vinylethyl group, a 4-vinylphenyl group, a 3-vinylphenyl group, a (4-vinylphenyl)methyl group, a 2-(4-vinylphenyl)ethyl group, a (3-vinylphenyl)methyl group, and a 2-(3-vinylphenyl)ethyl group.

Examples of a group in which $R^{21}$ is a methyl group, and $R^{23}$ and $R^{24}$ are each a hydrogen atom include an isopopenyl group, a methallyl group, a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group, and a 2-(3-isopropenylphenyl)ethyl group.

Examples of a group in which $R^{21}$ is a vinyl group, and $R^{23}$ and $R^{24}$ are each a hydrogen atom include a 1-methylene-2-propenyl group, and a 2-methylene-3-butenyl group.

Examples of a group in which $R^{21}$ is a phenyl group, and $R^{23}$ and $R^{24}$ are each a hydrogen atom include a 4-(1-phenylvinyl)phenyl group, a 3-(1-phenylvinyl)phenyl group, and a 2-(1-phenylvinyl)phenyl group.

Examples of a group in which $R^{21}$ is a hydrogen atom, $R^{23}$ is a methyl group, and $R^{24}$ is a hydrogen atom include a 1-propenyl group, a crotyl group, a 4-(1-propenyl)phenyl group, a 4-(1-propenyl)phenylmethyl group, a 2-{4-(1-propenyl)phenyl}ethyl group, a 3-(1-propenyl)phenyl group, a 3-(1-propenyl)phenylmethyl group, and a 2-{3-(1-propenyl)phenyl}ethyl group.

The group represented by the formula (2-V) is preferably a group represented by the following formula (2-V1).

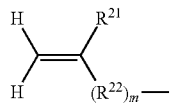

(2-V1)

wherein $R^{21}$ represents a hydrogen atom or a hydrocarbyl group, m is an integer of 0 or 1, and $R^{22}$ is a hydrocarbylene group.

The group represented by the formula (2-V1) is, preferably, as a group in which $R^{21}$ is a hydrogen atom, a vinyl group, a 4-vinylphenyl group, a 3-vinylphenyl group, a (4-vinylphenyl)methyl group, a 2-(4-vinylphenyl)ethyl group, a (3-vinylphenyl)methyl group, or a 2-(3-vinylphenyl)ethyl group; as a group in which $R^{21}$ is a methyl group, a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group, or a 2-(3-isopropenylphenyl)ethyl group; as a group in which $R^{21}$ is a vinyl group, a 1-methylene-2-propenyl group, or a 2-methylene-3-butenyl group; as a group in which $R^{21}$ is a phenyl group, a 4-(1-phenylvinyl)phenyl group.

The group represented by the formula (2-V1) is further preferably a vinyl group in which $R^{21}$ is a hydrogen atom, a (4-vinylphenyl)ethyl group, or a (3-vinylphenyl)ethyl group.

In the formula (2), $A^2$ represents a substituted amino group or a nitrogen-containing heterocyclic group.

The substituted amino group of $A^2$ is preferably a group represented by the following formula (2-A).

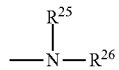

(2-A)

wherein $R^{25}$ and $R^{26}$ each represent a hydrocarbyl group, or a trihydrocarbylsilyl group, or $R^{25}$ and $R^{26}$ are bonded to represent a hydrocarbylene group optionally having a nitrogen atom and/or an oxygen atom as a hetero atom, or $R^{25}$ and $R^{26}$ are one group, and represent a group which bonds to a nitrogen atom with a double bond.

Examples of the hydrocarbyl group of $R^{25}$ and $R^{26}$ include an alkyl group, an alkenyl group, an alkynyl group, an aryl group, and an aralkyl group. Examples of the alkyl group include a methyl group, an ethyl group, a n-propyl group, an isopropyl group, a n-butyl group, a sec-butyl group, and a tert-butyl group. Examples of the alkenyl group include a vinyl group, an allyl group, a 1-propenyl group, and a 1-methylethenyl group. Examples of the alkynyl group include an ethynyl group, and a propargyl group. Examples of the aryl group include a phenyl group, a tolyl group, and a xylyl group. Examples of the aralkyl group include a benzyl group.

The hydrocarbyl group of $R^{25}$ and $R^{26}$ has preferably 1 to 10, more preferably 1 to 4, further preferably 1 to 2 carbon atoms.

The hydrocarbyl group of $R^{25}$ and $R^{26}$ is preferably an alkyl group, or an alkenyl group, more preferably an alkyl group, further preferably a linear alkyl group.

Examples of the trihydrocarbylsilyl group of $R^{25}$ and $R^{26}$ include trialkylsilyl groups such as a trimethylsilyl group, a triethylsilyl group, a triisopropylsilyl group, and a tert-butyldimethylsilyl group.

The trihydrocarbylsilyl group of $R^{25}$ and $R^{26}$ is preferably a trialkylsilyl group having 3 to 9 carbon atoms, more preferably a trialkylsilyl group in which an alkyl group bonded to a silicon atom is an alkyl group having 1 to 4 carbon atoms, further preferably a trimethylsilyl group.

Examples of the hydrocarbylene group optionally having a nitrogen atom and/or an oxygen atom as a hetero atom in which $R^{25}$ and $R^{26}$ are bonded include a hydrocarbylene group, a hydrocarbylene group having a nitrogen atom, and a hydrocarbylene group having an oxygen atom. Examples of the hydrocarbylene group include alkylene groups such as an ethylene group, a trimethylene group, a tetramethylene group, a pentamethylene group, and a hexamethylene group. Examples of the hydrocarbylene group having a nitrogen atom include a group represented by —$CH_2CH_2$—NH—$CH_2$—, a group represented by —$CH_2CH_2$—N=CH—, a group represented by —CH=CH—N=CH—, and a group represented by —$CH_2CH_2$—NH—$CH_2CH_2$—. Examples of the hydrocarbylene group having an oxygen atom include a group represented by —$CH_2CH_2$—O—$CH_2CH_2$—.

The group in which $R^{25}$ and $R^{26}$ are bonded has preferably 2 to 20, more preferably 2 to 7, further preferably 4 to 6 carbon atoms.

The hydrocarbylene group optionally having a nitrogen atom and/or an oxygen atom as a hetero atom in which $R^{25}$ and $R^{26}$ are bonded is preferably a hydrocarbylene group, more preferably an alkylene group, further preferably a polymethylene group.

Examples of one group in which $R^{25}$ and $R^{26}$ bond to a nitrogen atom with a double bond include hydrocarbylidene groups such as an ethylidene group, a propylidene group, a butylidene group, a 1-methylethylidene group, a 1-methylpropylidene group, and a 1,3-dimethylbutylidene group.

The one group in which $R^{25}$ and $R^{26}$ bond to a nitrogen atom with a double bond has preferably 2 to 20, more preferably 2 to 6 carbon atoms.

$R^{25}$ and $R^{26}$ are preferably a hydrocarbyl group, a trihydrocarbylsilyl group, or a hydrocarbylene group in which $R^{25}$ and $R^{26}$ are bonded.

Examples of the group represented by the formula (2-A) include a non-cyclic amino group, and a cyclic amino group.

Examples of the non-cyclic amino group include a dialkylamino group, and a bis(trialkylsilyl)amino group. Examples of the dialkylamino group include a dimethylamino group, a diethylamino group, a di(n-propyl)amino group, a di(isopropyl)amino group, a di(n-butyl)amino group, a di(sec-butyl) amino group, a di(tert-butyl)amino group, and an ethylmethylamino group. Examples of the bis(trialkylsilyl)amino group include a bis(trimethylsilyl)amino group, and a bis(tert-butyldimethylsilyl)amino group.

Examples of the non-cyclic amino group include an ethylideneamino group, a 1-methylpropylideneamino group, a 1,3-dimethylbutylideneamino group, a 1-methylethylideneamino group and a 4-N,N-dimethylaminobenzylideneamino group.

Examples of the cyclic amino group include a 1-aziridinyl group, a 1-azetidinyl group, a 1-pyrrolidinyl group, a 1-piperidinyl group, a 1-hexamethyleneimino group, a 1-imidazolyl group, a 4,5-dihydro-1-imidazolyl group, a 1-pyrrolyl group, a 1-pyrazolyl group, a 1-imidazolidinyl group, a 1-piperazinyl group, and a morpholino group.

The group represented by the formula (2-A) is preferably a group in which $R^{25}$ and $R^{26}$ are hydrocarbyl groups, a group in which $R^{25}$ and $R^{26}$ are trihydrocarbylsilyl groups, or a group in which $R^{25}$ and $R^{26}$ are bonded to form a hydrocarbylene group. More preferable is a group in which $R^{25}$ and $R^{26}$ are linear chain alkyl groups, a group in which $R^{25}$ and $R^{26}$ are trialkylsilyl groups, or a group in which $R^{25}$ and $R^{26}$ are bonded to form a polymethylene group.

The group represented by the formula (2-A) is further preferably a dimethylamino group, a diethylamino group, a di(n-propyl)amino group, a di(n-butyl)amino group, a bis(trimethylsilyl)amino group, a bis(tert-butyldimethylsilyl)amino group, a 1-pyrrolidinyl group, a 1-piperidinyl group, or a 1-hexamethyleneimino group.

Examples of the nitrogen-containing heterocyclic group of $A^2$ include a nitrogen-containing alicyclic heterocyclic group, and a nitrogen-containing aromatic heterocyclic group. Herein, the nitrogen-containing alicyclic heterocyclic group represents a group in which one hydrogen atom has been removed from a carbon atom of a heterocycle of a compound having a nitrogen-containing alicyclic heterocycle, and the nitrogen-containing alicyclic heterocycle represents an alicyclic heterocycle having a nitrogen atom as a hetero atom constituting a ring. The nitrogen-containing heterocyclic group represents a group in which one hydrogen atom has been removed from a carbon atom of a heterocycle of a compound having a nitrogen-containing heterocycle, and the nitrogen-containing heterocycle represents a heterocycle having a nitrogen atom as a hetero atom constituting a ring.

Examples of the nitrogen-containing alicyclic heterocyclic group of $A^2$ include a group having only a nitrogen atom as a hetero atom constituting a ring, a group having a nitrogen atom and an oxygen atom as a hetero atom constituting a ring, and a group having a nitrogen atom and a sulfur atom as a hetero atom constituting a ring.

Examples of the nitrogen-containing alicyclic heterocyclic group having only a nitrogen atom as a hetero atom constituting a ring include a group having an aziridine ring, a group having an azetidine ring, a group having a pyrrolidine ring, a group having a piperidine ring, a group having a hexamethyleneimine ring, a group having an imidazolidine ring, a group having a piperazine ring, and a group having a pyrazolidine ring.

Examples of the group having an aziridine ring include an 1-alkyl-2-aziridinyl group.

Examples of the group having an azetidine ring include an 1-alkyl-2-azetidinyl group, and an 1-alkyl-3-azetidinyl group.

Examples of the group having a pyrrolidine ring include an 1-alkyl-2-pyrrolidinyl group, and an 1-alkyl-3-pyrrolidinyl group.

Examples of the group having a piperidine ring include an 1-alkyl-2-piperidinyl group, an 1-alkyl-3-piperidinyl group, and an 1-alkyl-4-piperidinyl group.

Examples of the group having a hexamethyleneimine ring include an 1-alkyl-2-hexamethyleneinimo group, an 1-alkyl-3-hexamethyleneimino group, and an 1-alkyl-4-hexamethyleneimino group.

Examples of the group having an imidazolidine ring include a 1,3-dialkyl-2-imidazolidyl group, and a 1,3-dialkyl-4-imidazolidyl group.

Examples of the group having a piperazine ring include a 1,4-dialkyl-2-piperazinyl group.

Examples of the group having a pyrazolidine ring include a 1,2-dialkyl-3-pyrazolidyl group, and a 1,2-dialkyl-4-pyrazolidyl group.

Examples of the nitrogen-containing alicyclic heterocyclic group having a nitrogen atom and an oxygen atom as a hetero atom constituting a ring include a group having a morpholine ring and a group having an isooxazolidine ring.

Examples of the group having a morpholine ring include an 1-alkyl-2-morpholino group, and an 1-alkyl-3-morpholino group.

Examples of the group having an isooxazolidine ring include an 1-alkyl-3-isooxazolidinyl group, an 1-alkyl-4-isooxazolidinyl group, and an 1-alkyl-5-isooxazolidinyl group.

Examples of the nitrogen-containing alicyclic heterocyclic group having a nitrogen atom and a sulfur atom as a hetero atom constituting a ring include a group having a thiomorpholine ring, and a group having an isothiazolidine ring.

Examples of the group having a thiomorpholine ring include an 1-alkyl-2-thiomorpholino group, and an 1-alkyl-3-thiomorpholino group.

Examples of the group having an isothiazolidine ring include an 1-alkyl-3-isothiazolidinyl group, an 1-alkyl-4-isothiazolidinyl group, and an 1-alkyl-5-isothiazolidinyl group.

The nitrogen-containing alicyclic heterocyclic group of $A^2$ is preferably a group containing only a nitrogen atom as a hetero atom constituting a ring. In addition, the nitrogen-containing alicyclic heterocyclic group has preferably 4 to 10 carbon atoms.

Examples of the nitrogen-containing aromatic heterocyclic group of $A^2$ include a group having only a nitrogen atom as a hetero atom constituting a ring, a group having a nitrogen atom and an oxygen atom as a hetero atom constituting a ring, and a group having a nitrogen atom and a sulfur atom as a hetero atom constituting a ring.

Examples of the nitrogen-containing aromatic heterocyclic group having only a nitrogen atom as a hetero atom constituting a ring include a group having a pyrrole ring, a group having an imidazole ring, a group having a pyrazole ring, a group having a pyridine ring, a group having a pyridazine ring, a group having a pyrimidine ring, a group having a pyrazine ring, a group having a quinoline ring, a group having an isoquinoline ring, a group having a cinnoline ring, a group having a quinazoline ring, and a group having a phthalazine ring.

Examples of the group having a pyrrole ring include a 2-pyrrolyl group, a 3-pyrrolyl group, a 2-(1-methylpyrrolyl) group, and a 3-(1-methylpyrrolyl)group.

Examples of the group having an imidazole ring include a 2-imidazolyl group, a 4-imidazolyl group, a 5-imidazolyl group, a 2-(1-methylimidazolyl)group, a 4-(1-methylimidazolyl)group, and a 5-(1-methylimidazolyl)group.

Examples of the group having a pyrazole ring include a 3-pyrazolyl group, a 4-pyrazolyl group, a 5-pyrazolyl group, a 3-(1-methylpyrazolyl) group, a 4-(1-methylpyrazolyl) group and a 5-(1-methylpyrazolyl) group.

Examples of the group having a pyridine ring include a 2-pyridyl group, a 3-pyridyl group, and a 4-pyridyl group.

Examples of the group having a pyridazine ring include a 3-pyridazyl group, and a 4-pyridazyl group.

Examples of the group having a pyrimidine ring include a 2-pyrimidyl group, a 4-pyrimidyl group, and a 5-pyrimidyl group.

Examples of the group having a pyrazine group include a 2-pyrazyl group.

Examples of the group having a quinoline ring include a 2-quinolyl group, a 3-quinolyl group, a 4-quinolyl group, a 5-quinolyl group, a 6-quinolyl group, a 7-quinolyl group, and an 8-quinolyl group.

Examples of the group having an isoquinoline ring include a 1-isoquinolyl group, a 3-isoquinolyl group, a 4-isoquinolyl group, a 5-isoquinolyl group, a 6-isoquinolyl group, a 7-isoquinolyl group, and an 8-isoquinolyl group.

Examples of the group having a cinnoline ring include a 3-cinnolinyl group, a 4-cinnolinyl group, a 5-cinnolinyl group, a 6-cinnolinyl group, a 7-cinnolinyl group, and an 8-cinnolinyl group.

Examples of the group having a quinazoline ring include a 2-quinazolinyl group, a 4-quinazolinyl group, a 5-quinazolinyl group, a 6-quinazolinyl group, a 7-quinazolinyl group, and an 8-quinazolinyl group.

Examples of the group having a phthalazine ring include a 1-phthalazinyl group, a 5-phthalazinyl group and a 6-phthalazinyl group.

The nitrogen-containing aromatic heterocyclic group having only a nitrogen atom as a hetero atom constituting a ring is preferably the group having an imidazole ring, the group having a pyridine ring, or the group having a quinoline ring.

Examples of the nitrogen-containing aromatic heterocyclic group having a nitrogen atom and an oxygen atom as a hetero atom constituting a ring include a group having an oxazole ring, and a group having an isooxazole ring.

Examples of the group having an oxazole ring include a 2-oxazolyl group, a 4-oxazolyl group, and a 5-oxazolyl group.

Examples of the group having an isooxazole ring include a 3-isooxazolyl group, a 4-isooxazolyl group, and a 5-isooxazolyl group.

The nitrogen-containing aromatic heterocyclic group having a nitrogen atom and an oxygen atom as a hetero atom constituting a ring is preferably the group having an oxazole ring.

Examples of the nitrogen-containing aromatic heterocyclic group having a nitrogen atom and a sulfur atom as a hetero atom constituting a ring include a group having a thiazole ring, and a group having an isothiazole ring.

Examples of the group having a thiazole ring include a 2-thiazolyl group, a 4-thiazolyl group, and a 5-thiazolyl group.

Examples of the group having an isothiazole ring include a 3-isothiazolyl group, a 4-isothiazolyl group, and a 5-isothiazolyl group.

The nitrogen-containing aromatic heterocyclic group having a nitrogen atom and a sulfur atom as a hetero atom constituting a ring is preferably the group having a thiazole ring.

The nitrogen-containing aromatic heterocyclic group of $A^2$ is preferably a nitrogen-containing aromatic heterocyclic group having only a nitrogen atom as a hetero atom constituting a ring, more preferably a group having an imidazole ring, a group having a pyridine ring, or a group having a quinoline ring, further preferably a group having a pyridine ring.

As the compound represented by the formula (2), examples of a compound in which $V^2$ is a group represented by the formula (2-V1), $R^{21}$ in the formula (2-V1) is a hydrogen atom, m is 0, and $A^2$ is a substituted amino group include the following compounds.
1-vinylpyrrolidine,
1-vinylpiperidine,
1-vinylhexamethyleneimine,
1-vinylpiperazine,
1-vinylpyrrole,
1-vinylimidazole,
1-vinylpyrazole,
1-vinylquinoline.

As the compound represented by the formula (2), examples of a compound in which $V^2$ is a group represented by the formula (2-V1), $R^{21}$ in the formula (2-V1) is a hydrogen atom, m is 1, $R^{22}$ is a phenylene group, and $A^2$ is a substituted amino group include the following compounds.
4-N,N-dimethylaminostyrene,
4-N,N-diethylaminostyrene,
4-N,N-di-n-propylaminostyrene,
4-N,N-di-n-butylaminostyrene,
4-N,N-diallylaminostyrene,
4-N,N-bis(trimethylsilyl)aminostyrene,
4-N,N-bis(tert-butyldimethylsilyl)aminostyrene,
4-(1-aziridinyl)styrene,
4-(1-pyrrolidinyl)styrene,
4-(1-piperidinyl)styrene,
4-(1-hexamethyleneimino)styrene,
3-N,N-dimethylaminostyrene,
3-N,N-diethylaminostyrene,
3-N,N-di-n-propylaminostyrene,
3-N,N-di-n-butylaminostyrene,
3-N,N-diallylaminostyrene,
3-N,N-bis(trimethylsilyl)aminostyrene,
3-N,N-bis(tert-butyldimethylsilyl)aminostyrene,
3-(1-aziridinyl)styrene,
3-(1-pyrrolidinyl)styrene,
3-(1-piperidinyl)styrene,
3-(1-hexamethyleneimino)styrene.

As the compound represented by the formula (2), examples of a compound in which $V^2$ is a group represented by the formula (2-V1), $R^{21}$ in the formula (2-V1) is a hydrogen atom, m is 1, $R^{22}$ is a group represented by the formula (2-Ra), and $A^2$ is a substituted amino group include the following compounds.
Compounds in which i in the formula (2-Ra) is 1:
4-N,N-dimethylaminomethylstyrene,
4-N,N-diethylaminomethylstyrene,
4-N,N-di-n-propylaminomethylstyrene,
4-N,N-di-n-butylaminomethylstyrene,
4-N,N-diallylaminomethylstyrene,
4-N,N-bis(trimethylsilyl)aminomethylstyrene,
4-N,N-bis(tert-butyldimethylsilyl)aminomethylstyrene,
4-(1-aziridinyl)methylstyrene,
4-(1-pyrrolidinyl)methylstyrene,
4-(1-piperidinyl)methylstyrene,
4-(1-hexamethyleneimino)methylstyrene.
Compounds in which i in the formula (2-Ra) is 2:
4-N,N-dimethylaminoethylstyrene,
4-N,N-diethylaminoethylstyrene,
4-N,N-di-n-propylaminoethylstyrene,
4-N,N-di-n-butylaminoethylstyrene,
4-N,N-diallylaminoethylstyrene,
4-N,N-bis(trimethylsilyl)aminoethylstyrene,
4-N,N-bis(tert-butyldimethylsilyl)aminoethylstyrene,
4-(1-aziridinyl)ethylstyrene,
4-(1-pyrrolidinyl)ethylstyrene,
4-(1-piperidinyl)ethylstyrene,
4-(1-hexamethyleneimino)ethylstyrene.

As the compound represented by the formula (2), examples of a compound in which $V^2$ is a group represented by the formula (2-V1), $R^{21}$ in the formula (2-V1) is a hydrogen atom, m is 1, $R^{22}$ is a group represented by the formula (2-Rb), and $A^2$ is a substituted amino group include the following compounds.
Compounds in which j in the formula (2-Rb) is 1:
3-N,N-dimethylaminomethylstyrene,
3-N,N-diethylaminomethylstyrene,
3-N,N-di-n-propylaminomethylstyrene,
3-N,N-di-n-butylaminomethylstyrene,
3-N,N-diallylaminomethylstyrene,
3-N,N-bis(trimethylsilyl)aminomethylstyrene,
3-N,N-bis(tert-butyldimethylsilyl)aminomethylstyrene,
3-(1-aziridinyl)methylstyrene, 3-(1-pyrrolidinyl)methylstyrene,
3-(1-piperidinyl)methylstyrene,
3-(1-hexamethyleneimino)methylstyrene.
Compounds in which j in the formula (2-Rb) is 2:
3-N,N-dimethylaminoethylstyrene,
3-N,N-diethylaminoethylstyrene,
3-N,N-di-n-propylaminoethylstyrene,
3-N,N-di-n-buytlaminoethylstyrene,
3-N,N-diallylaminoethylstyrene,
3-N,N-bis(trimethylsilyl)aminoethylstyrene,
3-N,N-bis(tert-butyldimethylsilyl)aminoethylstyrene,
3-(1-aziridinyl)ethylstyrene,
3-(1-piperidinyl)ethylstyrene,
3-(1-hexamethyleneimino)ethylstyrene.

As the compound represented by the formula (2), examples of a compound in which $V^2$ is a group represented by the formula (2-V1), $R^{21}$ in the formula (2-V1) is a methyl group, m is 0, and $A^2$ is a substituted amino group include the following compounds.
1-isopropenylpyrrolidine,
1-isopropenylpiperidine,
1-isopropenylhexamethyleneimine,
1-isopropenylpiperazine,
1-isopropenylpyrrole,
1-isopropenylimidazole,
1-isopropenylpyrazole,
isopropenylquinoline.

As the compound represented by the formula (2), examples of a compound in which $V^2$ is a group represented by the formula (2-V1), $R^{21}$ in the formula (2-V1) is a methyl group, m is 1, $R^{22}$ is a phenylene group, and $A^2$ is a substituted amino group include the following compounds.
4-N,N-dimethylaminoisopropenylbenzene,
4-N,N-diethylaminoisopropenylbenzene,
4-N,N-di-n-propylaminoisopropenylbenzene,
4-N,N-di-n-butylaminoisopropenylbenzene,
4-N,N-diallylaminoisopropenylbenzene,
4-N,N-bis(trimethylsilyl)aminoisopropenylbenzene,
4-N,N-bis(tert-butyldimethylsilyl)aminoisopropenylbenzene,
4-(1-aziridinyl)isopropenylbenzene,
4-(1-pyrrolidinyl)isopropenylbenzene,
4-(1-piperidinyl)isopropenylbenzene,
4-(1-hexamethyleneimino)isopropenylbenzene,
3-N,N-dimethylaminoisopropenylbenzene,
3-N,N-diethylaminoisopropenylbenzene,
3-N,N-di-n-propylaminoisopropenylbenzene,
3-N,N-di-n-butylaminoisopropenylbenzene,
3-N,N-diallylaminoisopropenylbenzene,
3-N,N-bis(trimethylsilyl)aminoisopropenylbenzene,
3-N,N-bis(tert-butyldimethylsilyl)aminoisopropenylbenzene,
3-(1-aziridinyl)isopropenylbenzene,
3-(1-pyrrolidinyl)isopropenylbenzene,
3-(1-piperidinyl)isopropenylbenzene,
3-(1-hexamethyleneimino)isopropenylbenzene.

As the compound represented by the formula (2), examples of a compound in which $V^2$ is a group represented by the formula (2-V1), $R^{21}$ in the formula (2-V1) is a methyl group, m is 1, $R^{22}$ is a group represented by the formula (2-Ra), and $A^2$ is a substituted amino group include the following compounds.
Compounds in which i in the formula (2-Ra) is 1:
4-N,N-dimethylaminomethylisopropenylbenzene,
4-N,N-diethylaminomethylisopropenylbenzene,
4-N,N-di-n-propylaminomethylisopropenylbenzene,
4-N,N-di-n-butylaminomethylisopropenylbenzene,
4-N,N-diallylaminomethylisopropenylbenzene,
4-N,N-bis(trimethylsilyl)aminomethylisopropenylbenzene,
4-N,N-bis(tert-butyldimethylsilyl)aminomethylisopropenylbenzene,
4-(1-aziridinyl)methylisopropenylbenzene,
4-(1-pyrrolidinyl)methylisopropenylbenzene,
4-(1-piperidinyl)methylisopropenylbenzene,
4-(1-hexamethyleneimino)methylisopropenylbenzene.
Compounds in which i in the formula (2-Ra) is 2:
4-N,N-dimethylaminoethylisopropenylbenzene,
4-N,N-diethylaminoethylisopropenylbenzene,
4-N,N-di-n-propylaminoethylisopropenylbenzene,
4-N,N-di-n-butylaminoethylisopropenylbenzene,
4-N,N-diallylaminoethylisopropenylbenzene,
4-N,N-bis(trimethylsilyl)aminoethylisopropenylbenzene,
4-N,N-bis(tert-butyldimethylsilyl)aminoethylisopropenylbenzene,
4-(1-aziridinyl)ethylisopropenylbenzene,
4-(1-pyrrolidinyl)ethylisopropenylbenzene,
4-(1-piperidinyl)ethylisopropenylbenzene,
4-(1-hexamethyleneimino)ethylisopropenylbenzene.

As the compound represented by the formula (2), examples of a compound in which $V^2$ is a group represented by the formula (2-V1), $R^{21}$ in the formula (2-V1) is a methyl group, m is 1, $R^{22}$ is a group represented by the formula (2-Rb), and $A^2$ is a substituted amino group include the following compounds.
Compounds in which j in the formula (2-Rb) is 1:
3-N,N-dimethylaminomethylisopropenylbenzene,
3-N,N-diethylaminomethylisopropenylbenzene,
3-N,N-di-n-propylaminomethylisopropenylbenzene,
3-N,N-di-n-butylaminomethylisopropenylbenzene,
3-N,N-diallylaminomethylisopropenylbenzene,
3-N,N-bis(trimethylsilyl)aminomethylisopropenylbenzene,
3-N,N-bis(tert-butyldimethylsilyl)aminomethylisopropenylbenzene,
3-(1-aziridinyl)methylisopropenylbenzene,
3-(1-pyrrolidinyl)methylisopropenylbenzene,
3-(1-piperidinyl)methylisopropenylbenzene,
3-(1-hexamethyleneimino)methylisopropenylbenzene.
Compounds in which j in the formula (2-Rb) is 2:
3-N,N-dimethylaminoethylisopropenylbenzene,
3-N,N-diethylaminoethylisopropenylbenzene,
3-N,N-di-n-propylaminoethylisopropenylbenzene,
3-N,N-di-n-butylaminoethylisopropenylbenzene,
3-N,N-diallylaminoethylisopropenylbenzene,
3-N,N-bis(trimethylsilyl)aminoethylisopropenylbenzene,
3-N,N-bis(tert-butyldimethylsilyl)aminoethylisopropenylbenzene,
3-(1-aziridinyl)ethylisopropenylbenzene,
3-(1-pyrrolidinyl)ethylisopropenylbenzene,
3-(1-piperidinyl)ethylisopropenylbenzene,
3-(1-hexamethyleneimino)ethylisopropenylbenzene.

As the compound represented by the formula (2), examples of a compound in which $V^2$ is a group represented by the formula (2-V1), $R^{21}$ in the formula (2-V1) is a vinyl group, m is 0, and $A^2$ is a substituted amino group include the following compounds.
2-N,N-dimethylamino-1,3-butadiene,
2-N,N-diethylamino-1,3-butadiene,
2-N,N-di-n-propylamino-1,3-butadiene,
2-N,N-di-n-butylamino-1,3-butadiene,
2-N,N-diallylamino-1,3-butadiene,
2-N,N-bis(trimethylsilyl)amino-1,3-butadiene,
2-N,N-bis(tert-butyldimethylsilyl)amino-1,3-butadiene,
2-(1-aziridinyl)-1,3-butadiene,
2-(1-pyrrolidinyl)-1,3-butadiene, 2-(1-piperidinyl)-1,3-butadiene,
2-(1-hexamethyleneimino)-1,3-butadiene,
2-(1-pyrrolyl)-1,3-butadiene,
2-(1-imidazolyl)-1,3-butadiene,
2-(1-pyrazolyl)-1,3-butadiene.

As the compound represented by the formula (2), examples of a compound in which $V^2$ is a group represented by the formula (2-V1), $R^{21}$ in the formula (2-V1) is a vinyl group, m is 1, $R^{22}$ is an alkylene group, and $A^2$ is a substituted amino group include the following compounds.
Compounds in which $R^{22}$ is a methylene group:
2-N,N-dimethylaminomethyl-1,3-butadiene,
2-N,N-diethylaminomethyl-1,3-butadiene,
2-N,N-di-n-propylaminomethyl-1,3-butadiene,
2-N,N-di-n-butylaminomethyl-1,3-butadiene,
2-N,N-diallylaminomethyl-1,3-butadiene,
2-N,N-bis(trimethylsilyl)aminomethyl-1,3-butadiene,
2-N,N-bis(tert-butyldimethylsilyl)aminomethyl-1,3-butadiene,
2-(1-aziridinyl)methyl-1,3-butadiene,
2-(1-pyrrolidinyl)methyl-1,3-butadiene,
2-(1-piperidinyl)methyl-1,3-butadiene,
2-(1-hexamethyleneimino)methyl-1,3-butadiene,
1-(2-methylene-3-butenyl)pyrrole,
1-(2-methylene-3-butenyl)imidazole,
1-(2-methylene-3-butenyl)pyrazole.
Compounds in which $R^{22}$ is an ethylene group:
5-N,N-dimethylamino-3-methylene-1-pentene,
5-N,N-diethylamino-3-methylene-1-pentene,
5-N,N-di-n-propylamino-3-methylene-1-pentene,
5-N,N-di-n-butylamino-3-methylene-1-pentene,
5-N,N-diallylamino-3-methylene-1-pentene,
5-N,N-bis(trimethylsilyl)amino-3-methylene-1-pentene,
5-N,N-bis(tert-butyldimethylsilyl)amino-3-methylene-1-pentene,
5-(1-aziridinyl)-3-methylene-1-pentene,
5-(1-pyrrolidinyl)-3-methylene-1-pentene,
5-(1-piperidinyl)-3-methylene-1-pentene,
5-(1-hexamethyleneimino)-3-methylene-1-pentene,
1-(3-methylene-4-pentenyl)pyrrole,
1-(3-methylene-4-pentenyl)imidazole,
1-(3-methylene-4-pentenyl)pyrazole.

As the compound represented by the formula (2), examples of a compound in which $V^2$ is a group represented by the formula (2-V1), $R^{21}$ in the formula (2-V1) is a phenyl group, m is 1, $R^{22}$ is a phenylene group and $A^2$ is a substituted amino group include the following compounds.
1-(4-N,N-dimethylaminophenyl)-1-phenylethylene,
1-(4-N,N-diethylaminophenyl)-1-phenylethylene,
1-(4-N,N-dipropylaminophenyl)-1-phenylethylene,
1-(4-N,N-diisopropylaminophenyl)-1-phenylethylene,
1-(4-N,N-dibutylaminophenyl)-1-phenylethylene,
1-(4-N,N-diisobutylaminophenyl)-1-phenylethylene,
1-[4-N,N-di(tert-butyl)aminophenyl]-1-phenylethylene,
1-(4-N,N-diphenylaminophenyl)-1-phenylethylene,
1-[4-(1-aziridinyl)phenyl]-1-phenylethylene,
1-[4-(1-pyrrolidinyl)phenyl]-1-phenylethylene,
1-[4-(1-piperidinyl)phenyl]-1-phenylethylene,
1-(4-hexamethyleneiminophenyl)-1-phenylethylene,
1-(4-morpholinophenyl)-1-phenylethylene,
1-{4-[N,N-bis(trimethylsilyl)amino]phenyl}-1-phenylethylene,
1-{4-[N,N-bis(tert-butyldimethylsilyl)amino]phenyl}-1-phenylethylene,
1-{4-[N,N-bis(triisopropylsilyl)amino]phenyl}-1-phenylethylene,
1-(3-N,N-dimethylaminophenyl)-1-phenylethylene,
1-(3-N,N-diethylaminophenyl)-1-phenylethylene,
1-(3-N,N-dipropylaminophenyl)-1-phenylethylene,
1-(3-N,N-diisopropylaminophenyl)-1-phenylethylene,
1-(3-N,N-dibutylaminophenyl)-1-phenylethylene,
1-(3-N,N-diisobutylaminophenyl)-1-phenylethylene,
1-(3-N,N-di(tert-butyl)aminophenyl)-1-phenylethylene,
1-(3-N,N-diphenylaminophenyl)-1-phenylethylene,
1-[3-(1-aziridinyl)phenyl]-1-phenylethylene,
1-[3-(1-pyrrolidinyl)phenyl]-1-phenylethylene,
1-[3-(1-piperidinyl)phenyl]-1-phenylethylene,
1-[3-(1-hexamethyleneimino)phenyl]-1-phenylethylene,
1-(3-morpholinophenyl)-1-phenylethylene,
1-{3-[N,N-bis(trimethylsilyl)amino]phenyl}-1-phenylethylene,
1-{3-[N,N-bis(tert-butyldimethylsilyl)amino]phenyl}-1-phenylethylene,
1-{3-[N,N-bis(triisopropylsilyl)amino]phenyl}-1-phenylethylene.

As the compound represented by the formula (2), examples of a compound in which $V^2$ is a group represented by the formula (2-V1), $R^{21}$ in the formula (2-V1) is a phenyl group, m is 1, $R^{22}$ is a group represented by the formula (2-Ra), and $A^2$ is a substituted amino group include the following compounds.
Compounds in which i in the formula (2-Ra) is 1:
1-(4-N,N-dimethylaminomethylphenyl)-1-phenylethylene,
1-(4-N,N-diethylaminomethylphenyl)-1-phenylethylene,
1-(4-N,N-dipropylaminomethylphenyl)-1-phenylethylene,
1-(4-N,N-diisopropylaminomethylphenyl)-1-phenylethylene,
1-(4-N,N-dibutylaminomethylphenyl)-1-phenylethylene,
1-(4-N,N-diisobutylaminomethylphenyl)-1-phenylethylene,
1-[4-N,N-di(tert-butyl)aminomethylphenyl]-1-phenylethylene,
1-[4-(N,N-diphenylaminomethyl)phenyl]-1-phenylethylene,
1-[4-(1-aziridinylmethyl)phenyl]-1-phenylethylene,
1-[4-(1-pyrrolidinylmethyl)phenyl]-1-phenylethylene,
1-[4-(1-piperidinylmethyl)phenyl]-1-phenylethylene,
1-[4-(1-hexamethyleneiminomethyl)phenyl]-1-phenylethylene,
1-(4-morpholinomethylphenyl)-1-phenylethylene,
1-{4-[N,N-bis(trimethylsilyl)aminomethyl]phenyl}-1-phenylethylene,
1-{4-[N,N-bis(tert-butyldimethylsilyl)aminomethyl]phenyl}-1-phenylethylene,
1-{4-[N,N-bis(triisopropylsilyl)aminomethyl]phenyl}-1-phenylethylene.

As the compound represented by the formula (2), examples of a compound in which $V^2$ is a group represented by the formula (2-V1), $R^{21}$ in the formula (2-V1) is a phenyl group, m is 1, $R^{22}$ is a group represented by the formula (2-Rb), and $A^2$ is a substituted amino group include the following compounds.
Compounds in which j in the formula (2-Rb) is 1:
1-(3-N,N-dimethylaminomethylphenyl)-1-phenylethylene,
1-(3-N,N-diethylaminomethylphenyl)-1-phenylethylene,
1-(3-N,N-dipropylaminomethylphenyl)-1-phenylethylene,
1-(3-N,N-diisopropylaminomethylphenyl)-1-phenylethylene,
1-(3-N,N-dibutylaminomethylphenyl)-1-phenylethylene,
1-(3-N,N-diisobutylaminomethylphenyl)-1-phenylethylene,
1-[3-N,N-di(tert-butyl)aminomethylphenyl]-1-phenylethylene,
1-(3-N,N-diphenylaminomethylphenyl)-1-phenylethylene,
1-[3-(1-aziridinylmethyl)phenyl]-1-phenylethylene,
1-[3-(1-pyrrolidinylmethyl)phenyl]-1-phenylethylene,
1-[3-(1-piperidinylmethyl)phenyl]-1-phenylethylene, 1-[3-(1-hexamethyleneiminomethyl)phenyl]-1-phenylethylene,
1-(3-morpholinomethylphenyl)-1-phenylethylene,
1-{3-[N,N-bis(trimethylsilyl)aminomethyl]phenyl}-1-phenylethylene,
1-{3-[N,N-bis(tert-butyldimethylsilyl)aminomethyl]phenyl}-1-phenylethylene,
1-{3-[N,N-bis(triisopropylsilyl)aminomethyl]phenyl}-1-phenylethylene.

As the compound represented by the formula (2), examples of a compound in which $V^2$ is a group represented by the formula (2-V1), $R^{21}$ in the formula (2-V1) is a hydrogen atom, m is 0, and $A^2$ is a nitrogen-containing alicyclic heterocyclic group include the following compounds.
1-methyl-3-vinylpyrrolidine,
1-methyl-4-vinylpiperidine,
1-methyl-3-vinylhexamethyleneimine,
1-methyl-4-vinylhexamethyleneimine.

As the compound represented by the formula (2), examples of a compound in which $V^2$ is a group represented by the formula (2-V1), $R^{21}$ in the formula (2-V1) is a hydrogen atom, m is 1, $R^{22}$ is a phenylene group, and $A^2$ is a nitrogen-containing alicyclic heterocyclic group include the following compounds.
1-methyl-3-(4-vinylphenyl)pyrrolidine,
1-methyl-4-(4-vinylphenyl)piperidine,
1-methyl-3-(4-vinylphenyl)hexamethyleneimine,
1-methyl-4-(4-vinylphenyl)hexamethyleneimine,
1-methyl-3-(3-vinylphenyl)pyrrolidine,
1-methyl-4-(3-vinylphenyl)piperidine,
1-methyl-3-(3-vinylphenyl)hexamethyleneimine,
1-methyl-4-(3-vinylphenyl)hexamethyleneimine.

As the compound represented by the formula (2), examples of a compound in which $V^2$ is a group represented by the formula (2-V1), $R^{21}$ in the formula (2-V1) is a hydrogen atom, m is 1, $R^{22}$ is a group represented by the formula (2-Ra), and $A^2$ is a nitrogen-containing alicyclic heterocyclic group include the following compounds.
Compounds in which i in the formula (2-Ra) is 1:
1-methyl-3-(4-vinylphenylmethyl)pyrrolidine,
1-methyl-4-(4-vinylphenylmethyl)piperidine,
1-methyl-3-(4-vinylphenylmethyl)hexamethyleneimine,
1-methyl-4-(4-vinylphenylmethyl)hexamethyleneimine.
Compounds in which i in the formula (2-Ra) is 2:
1-methyl-3-(4-vinylphenylethyl)pyrrolidine,
1-methyl-4-(4-vinylphenylethyl)piperidine,
1-methyl-3-(4-vinylphenylethyl)hexamethyleneimine,
1-methyl-4-(4-vinylphenylethyl)hexamethyleneimine.

As the compound represented by the formula (2), examples of a compound in which $V^2$ is a group represented by the formula (2-V1), $R^{21}$ in the formula (2-V1) is a hydrogen atom, m is 1, $R^{22}$ is a group represented by the formula (2-Rb), and $A^2$ is a nitrogen-containing alicyclic heterocyclic group include the following compounds.
Compounds in which j in the formula (2-Rb) is 1:
1-methyl-3-(3-vinylphenylmethyl)pyrrolidine,
1-methyl-4-(3-vinylphenylmethyl)piperidine,
1-methyl-3-(3-vinylphenylmethyl)hexamethyleneimine,
1-methyl-4-(3-vinylphenylmethyl)hexamethyleneimine.
Compounds in which j in the formula (2-Rb) is 2:
1-methyl-3-(3-vinylphenylethyl)pyrrolidine,
1-methyl-4-(3-vinylphenylethyl)piperidine,
1-methyl-3-(3-vinylphenylethyl)hexamethyleneimine,
1-methyl-4-(3-vinylphenylethyl)hexamethyleneimine.

As the compound represented by the formula (2), examples of a compound in which $V^2$ is a group represented by the formula (2-V1), $R^{21}$ in the formula (2-V1) is a methyl group, m is 0, and $A^2$ is a nitrogen-containing alicyclic heterocyclic group include the following compounds.
1-methyl-3-isopropenylimidazole,
1-methyl-4-isopropenylimidazole,
1-methyl-3-isopropenylhexamethyleneimine,
1-methyl-4-isopropenylhexamethyleneimine.

As the compound represented by the formula (2), examples of a compound in which $V^2$ is a group represented by the formula (2-V1), $R^{21}$ in the formula (2-V1) is a methyl group, m is 1, $R^{22}$ is a phenylene group, and $A^2$ is a nitrogen-containing alicyclic heterocyclic group include the following compounds.
1-methyl-3-(4-isopropenylphenyl)pyrrolidine,
1-methyl-4-(4-isopropenylphenyl)piperidine,
1-methyl-3-(4-isopropenylphenyl)hexamethyleneimine,
1-methyl-4-(4-isopropenylphenyl)hexamethyleneimine.

As the compound represented by the formula (2), examples of a compound in which $V^2$ is a group represented by the formula (2-V1), $R^{21}$ in the formula (2-V1) is a methyl group, m is 1, $R^{22}$ is a group represented by the formula (2-Ra), and $A^2$ is a nitrogen-containing alicyclic heterocyclic group include the following compounds.
Compounds in which i in the formula (2-Ra) is 1:
1-methyl-3-(4-isopropenylphenylmethyl)pyrrolidine,
1-methyl-4-(4-isopropenylphenylmethyl)piperidine,
1-methyl-3-(4-isopropenylphenylmethyl)hexamethyleneimine,
1-methyl-4-(4-isopropenylphenylmethyl)hexamethyleneimine.
Compounds in which i in the formula (2-Ra) is 2:
1-methyl-3-(4-isopropenylphenylethyl)pyrrolidine,
1-methyl-4-(4-isopropenylphenylethyl)piperidene,
1-methyl-3-(4-isopropenylphenylethyl)hexamethyleneimine,
1-methyl-4-(4-isopropenylphenylethyl)hexamethyleneimine.

As the compound represented by the formula (2), examples of a compound in which $V^2$ is a group represented by the formula (2-V1), $R^{21}$ in the formula (2-V1) is a vinyl group, m is 0, and $A^2$ is a nitrogen-containing alicyclic heterocyclic group include the following compounds.
1-methyl-3-(1-methylene-2-propenyl)pyrrolidine,
1-methyl-2-(1-methylene-2-propenyl)hexamethyleneimine,
1-methyl-3-(1-methylene-2-propenyl)hexamethyleneimine,
1-methyl-4-(1-methylene-2-propenyl)hexamethyleneimine.

As the compound represented by the formula (2), examples of a compound in which $V^2$ is a group represented by the formula (2-V1), $R^{21}$ in the formula (2-V1) is a vinyl group, m is 1, $R^{22}$ is an alkylene group, and $A^2$ is a nitrogen-containing alicyclic heterocyclic group include the following compounds.
Compounds in which $R^{22}$ is a methylene group:
1-methyl-3-(2-methylene-3-butenyl)pyrrolidine,
1-methyl-4-(2-methylene-3-butenyl)imidazole,
1-methyl-3-(2-methylene-3-butenyl)hexamethyleneimine,
1-methyl-4-(2-methylene-3-butenyl)hexamethyleneimine.
Compounds in which $R^{22}$ is an ethylene group:
1-methyl-3-(3-methylene-4-pentenyl)pyrrolidine,
1-methyl-4-(3-methylene-4-pentenyl)hexamethyleneimine,
1-methyl-3-(3-methylene-4-pentenyl)hexamethyleneimine,
1-methyl-4-(3-methylene-4-pentenyl)hexamethyleneimine.

As the compound represented by the formula (2), examples of a compound in which $V^2$ is a group represented by the formula (2-V1), $R^{21}$ in the formula (2-V1) is a phenyl group, m is 1, $R^{22}$ is a phenylene group, and $A^2$ is a nitrogen-containing alicyclic heterocyclic group include the following compounds.

1-[4-(1-methyl-3-pyrrolidiny)phenyl]-1-phenylethylene,
1-[4-(1-methyl-3-piperidinyl)phenyl]-1-phenylethylene,
1-[4-(1-methyl-4-piperidinyl)phenyl]-1-phenylethylene,
1-[4-(1-methyl-3-hexamethyleneimino)phenyl]-1-phenylethylene,
1-[4-(1-methyl-4-hexamethyleneimino)phenyl]-1-phenylethylene,
1-[3-(1-methyl-3-pyrrolidinyl)phenyl]-1-phenylethylene,
1-[3-(1-methyl-3-piperidinyl)phenyl]-1-phenylethylene,
1-[3-(1-methyl-4-piperidinyl)phenyl]-1-phenylethylene,
1-[3-(1-methyl-3-hexamethyleneimino)phenyl]-1-phenylethylene,
1-[3-(1-methyl-4-hexamethyleneimino)phenyl]-1-phenylethylene.

As the compound represented by the formula (2), examples of a compound in which $V^2$ is a group represented by the formula (2-V1), $R^{21}$ in the formula (2-V1) is a phenyl group, m is 1, $R^{22}$ is a group represented by the formula (2-Ra), and $A^2$ is a nitrogen-containing alicyclic heterocyclic group include the following compounds.
Compounds in which i in the formula (2-Ra) is 1:
1-{4-[(1-methyl-3-pyrrolidinyl)methyl]phenyl}-1-phenylethylene,
1-{4-[(1-methyl-3-piperidinyl)methyl]phenyl}-1-phenylethylene,
1-{4-(1-methyl-4-piperidinyl)methyl)phenyl}-1-phenylethylene,
1-{4-[(1-methyl-3-hexamethyleneimino)methyl]phenyl}-1-phenylethylene.

As the compound represented by the formula (2), examples of a compound in which $V^2$ is a group represented by the formula (2-V1), $R^{21}$ in the formula (2-V1) is a phenyl group, m is 1, $R^{22}$ is a group represented by the formula (2-Rb), and $A^2$ is a nitrogen-containing alicyclic heterocyclic group include the following compounds.
Compounds in which j in the formula (2-Rb) is 1:
1-(3-N,N-dimethylaminomethylphenyl)-1-phenylethylene,
1-(3-N,N-diethylaminomethylphenyl)-1-phenylethylene,
1-(3-N,N-dipropylaminomethylphenyl)-1-phenylethylene,
1-(3-N,N-diisopropylaminomethylphenyl)-1-phenylethylene.

As the compound represented by the formula (2), examples of a compound in which $V^2$ is a group represented by the formula (2-V1), $R^{21}$ in the formula (2-V1) is a hydrogen atom, m is 0, and $A^2$ is a nitrogen-containing aromatic heterocyclic group include the following compounds.
1-methyl-2-vinylimidazole,
1-methyl-4-vinylimidazole,
1-methyl-5-vinylimidazole,
2-vinylpyridine,
3-vinylpyridine,
4-vinylpyridine,
2-vinylquinoline,
3-vinylquinoline,
4-vinylquinoline.

As the compound represented by the formula (2), examples of a compound in which $V^2$ is a group represented by the formula (2-V1), $R^{21}$ in the formula (2-V1) is a methyl group, m is 0, and $A^2$ is a nitrogen-containing aromatic heterocyclic group include the following compounds.
1-methyl-2-isopropenylimidazole,
1-methyl-4-isopropenylimidazole,
1-methyl-5-isopropenylimidazole,
2-isopropenylpyridine,
3-isopropenylpyridine,
4-isopropenylpyridine,
2-isopropenylquinoline,
3-isopropenylquinoline,
4-isopropenyquinoline.

As the compound represented by the formula (2), examples of a compound in which $V^2$ is a group represented by the formula (2-V1), $R^{21}$ in the formula (2-V1) is a vinyl group, m is 0, and $A^2$ is a nitrogen-containing aromatic heterocyclic group include the following compounds.
1-methyl-2-(1-methylene-2-propenyl)imidazole,
1-methyl-4-(1-methylene-2-propenyl)imidazole,
1-methyl-5-(1-methylene-2-propenyl)imidazole,
2-(1-methylene-2-propenyl)pyridine,
3-(1-methylene-2-propenyl)pyridine,
4-(1-methylene-2-propenyl)pyridine,
2-(1-methylene-2-propenyl)quinoline,
3-(1-methylene-2-propenyl)quinoline,
4-(1-methylene-2-propenyl)quinoline.

As the compound represented by the formula (2), examples of a compound in which $V^2$ is a group represented by the formula (2-V1), $R^{21}$ in the formula (2-V1) is a vinyl group, m is 1, $R^{22}$ is an alkylene group, and $A^2$ is a nitrogen-containing aromatic heterocyclic group include the following compounds.
Compounds in which $R^{22}$ is a methylene group:
1-methyl-2-(2-methylene-3-butenyl)imidazole,
1-methyl-4-(2-methylene-3-butenyl)imidazole,
1-methyl-5-(2-methylene-3-butenyl)imidazole,
2-(2-methylene-3-butenyl)pyridine,
3-(2-methylene-3-butenyl)pyridine,
4-(2-methylene-3-butenyl)pyridine,
2-(2-methylene-3-butenyl)quinoline,
3-(2-methylene-3-butenyl)quinoline,
4-(2-methylene-3-butenyl)quinoline.
Compounds in which $R^{22}$ is an ethylene group:
1-methyl-2-(3-methylene-4-pentenyl)imidazole,
1-methyl-4-(3-methylene-4-pentenyl)imidazole,
1-methyl-5-(3-methylene-4-pentenyl)imidazole,
2-(3-methylene-4-pentenyl)pyridine,
3-(3-methylene-4-pentenyl)pyridine,
4-(3-methylene-4-pentenyl)pyridine,
2-(3-methylene-4-pentenyl)quinoline,
3-(3-methylene-4-pentenyl)quinoline,
4-(3-methylene-4-pentenyl)quinoline.

The compound represented by the formula (2) is preferably a compound in which a group represented by $V^2$ is represented by the formula (2-V1), and $R^{21}$ in the formula (2-V1) is a hydrogen atom.
More preferable is
a compound in which $R^{21}$ is a hydrogen atom, m is 1, $R^{22}$ is a phenylene group, and $A^2$ is a substituted amino group represented by the formula (2-A);
a compound in which $R^{21}$ is a hydrogen atom, m is 1, $R^{22}$ is a group represented by the formula (2-R), and $A^2$ is a substituted amino group represented by the formula (2-A); or
a compound in which $R^{21}$ is a hydrogen atom, m is 0, and $A^2$ is a nitrogen-containing aromatic heterocyclic group.
Further preferable is
a compound in which $R^{21}$ is a hydrogen atom, m is 1, $R^{22}$ is a para-phenylene group or a meta-phenylene group, and $A^2$ is a polymethylene group in which $R^{25}$ and $R^{26}$ in the formula (2-A) are bonded;
a compound in which $R^{21}$ is a hydrogen atom, m is 1, $R^{22}$ is a group represented by the formula (2-Ra) or (2-Rb), and $A^2$ is a polymethylene group in which $R^{25}$ and $R^{26}$ in the formula (2-A) are bonded; or
a compound in which $R^{21}$ is a hydrogen atom, m is 0, and $A^2$ is a pyridyl group.

The compound represented by the formula (2) is particularly preferably
3-(1-pyrrolidinyl)ethylstyrene,
4-(1-pyrrolidinyl)ethylstyrene,
4-vinylpyridine,
2-vinylpyridine.

Examples of the alkoxysilane compound include a tetraalkoxysilane compound, an alkoxysilane compound having an alkyl group, an alkoxysilane compound having a halogen atom, an alkoxysilane compound having an epoxy group, an alkoxysilane compound having a mercapto group, and an alkoxysilane compound having a substituted amino group.

Examples of the tetraalkoxysilane compound include tetramethoxysilane, tetraethoxysilane, tetra-n-propoxysilane, tetraisopropoxysilane, tetra-n-butoxysilane, tetraisobutoxysilane, tetra-tert-butoxysilane, and tetra-(2-ethylhexanoxy)silane.

Examples of the alkoxysilane compound having an alkyl group include methyltrimethoxysilane, methyltriethoxysilane, methyltri-n-propoxysilane, methyltriisopropoxysilane, methyltri-n-butoxysilane, methyltriisobutoxysilane, methyltri-tert-butoxysilane, methyltri-(2-ethylhexanoxy)silane, dimethyldimethoxysilane, dimethyldiethoxysilane, dimethyldi-n-propoxysilane, dimethyldiisopropoxysilane, dimethyldi-n-butoxysilane, dimethyldiisobutoxysilane, dimethyldi-tert-butoxysilane, and dimethyldi-(2-ethylhexanoxy)silane.

Examples of the alkoxysilane compound having a halogen atom include
trimethoxychlorosilane, triethoxychlorosilane, tri-n-propoxychlorosilane, triisopropoxychlorosilane, tri-n-butoxychlorosilane, triisobutoxychlorosilane, tri-tert-butoxychlorosilane, tri-(2-ethylhexanoxy)chlorosilane, dimethoxydichlorosilane, diethoxydichlorosilane, di-n-propoxydichlorosilane, diisopropoxydichlorosilane, di-n-butoxydichlorosilane, diisobutoxydichlorosilane, di-tert-butoxydichlorosilane, di-(2-ethylhexanoxy)dichlorosilane, methoxytrichlorosilane, ethoxytrichlorosilane,
trimethoxybromosilane, triethoxybromosilane, tri-n-propoxybromosilane, triisopropoxybromosilane, tri-n-butoxybromosilane, dimethoxydibromosilane, diethoxydibromosilane, di-n-propoxydibromosilane, diisopropoxydibromosilane, di-n-butoxydibromosilane, methoxytribromosilane, ethoxytribromosilane,
trimethoxyiodosilane, triethoxyiodosilane, tri-n-propoxyiodosilane, triisopropoxyiodosilane, tri-n-butoxyiodosilane, dimethoxydiiodosilane, diethoxydiiodosilane, di-n-propoxydiiodosilane, diisopropoxydiiodosilane, di-n-butoxydiiodosilane, methoxytriiodosilane, and ethoxytriiodosilane.

Examples of the alkoxysilane compound having an epoxy group include 2-glycidoxyethyltrimethoxysilane, 3-glycidoxypropyltrimethoxysilane, 4-glycidoxybutyltrimethoxysilane, 2-glycidoxyethyltriethoxysilane, 3-glycidoxypropyltriethoxysilane, 4-glycidoxybutyltriethoxysilane, 2-glycidoxyethyltripropoxysilane, 3-glycidoxypropyltripropoxysilane, 4-glycidoxybutyltripropoxysilane,
3-glycidoxypropylmethyldimethoxysilane, 3-glycidoxypropylmethyldiethoxysilane, 3-glycidoxypropylethyldimethoxysilane, 3-glycidoxypropylethyldiethoxysilane,
3-glycidoxypropyldimethylmethoxysilane, 3-glycidoxypropyldimethylethoxysilane, 3-glycidoxypropyldiethylmethoxysilane, 3-glycidoxypropyldiethylethoxysilane,
bis(3-glycidoxypropyl)dimethoxysilane, bis(3-glycidoxypropyl)diethoxysilane, bis(3-glycidoxypropyl)dipropoxysilane,
bis(3-glycidoxypropyl)methylmethoxysilane, bis(3-glycidoxypropyl)methylethoxysilane, bis(3-glycidoxypropyl)ethylmethoxysilane, bis(3-glycidoxypropyl)ethylethoxysilane, tris(3-glycidoxypropyl)methoxysilane, tris(3-glycidoxypropyl)ethoxysilane, tris(3-glycidoxypropyl)dipropoxysilane,
β-(3,4-epoxycyclohexyl)ethyl-trimethoxysilane, β-(3,4-epoxycyclohexyl)ethyl-triethoxysilane, β-(3,4-epoxycyclohexyl)ethyl-tripropoxysilane, β-(3,4-epoxycyclohexyl)propyl-trimethoxysilane, β-(3,4-epoxycyclohexyl)propyl-triethoxysilane, β-(3,4-epoxycyclohexyl)propyl-tripropoxysilane,
β-(3,4-epoxycyclohexyl)ethyl-methyldimethoxysilane, β-(3,4-epoxycyclohexyl)ethyl-methyldiethoxysilane, β-(3,4-epoxycyclohexyl)propyl-methyldimethoxysilane, β-(3,4-epoxycyclohexyl)propyl-methyldiethoxysilane,
β-(3,4-epoxycyclohexyl)ethyl-dimethylmethoxysilane, β-(3,4-epoxycyclohexyl)ethyl-dimethylethoxysilane, β-(3,4-epoxycyclohexyl)propyl-dimethylmethoxysilane, and β-(3,4-epoxycyclohexyl)propyl-dimethylethoxysilane.

Examples of the alkoxysilane compound having a mercapto group include 2-mercaptoethyltrimethoxysilane, 3-mercaptopropyltrimethoxysilane, 4-mercaptobutyltrimethoxysilane, 2-mercaptoethyltriethoxysilane, 3-mercaptopropyltriethoxysilane, 4-mercaptobutyltriethoxysilane, 2-mercaptoethyltripropoxysilane, 3-mercaptopropyltripropoxysilane, 4-mercaptobutyltripropoxysilane, 2-mercaptoethylmethyldimethoxysilane, 3-mercaptopropylmethyldimethoxysilane, 4-mercaptobutylmethyldimethoxysilane, 2-mercaptoethylmethyldiethoxysilane, 3-mercaptopropylmethyldiethoxysilane, and 4-mercaptobutylmethyldiethoxysilane.

Examples of the alkoxysilane compound having a substituted amino group include compounds represented by the following formula (3).

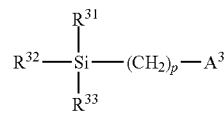

(3)

wherein p represents an integer of 1 to 10, $R^{31}$, $R^{32}$ and $R^{33}$ each represent independently an alkyl group or an alkoxy group, at least one of $R^{31}$, $R^{32}$ and $R^{33}$ is an alkoxy group, and $A^3$ represents a substituted amino group.

$R^{31}$, $R^{32}$ and $R^{33}$ each represent an alkyl group, or an alkoxy group.

Examples of the alkyl group of $R^{31}$, $R^{32}$ and $R^{33}$ include a methyl group, an ethyl group, a n-propyl group, an isopropyl group, a n-butyl group, a sec-butyl group, and a tert-butyl group. The alkyl group has preferably 1 to 10 carbon atoms, more preferably 1 to 3 carbon atoms, and is further preferably a methyl group or an ethyl group.

Examples of the alkoxy group of $R^{31}$, $R^{32}$ and $R^{33}$ include a methoxy group, an ethoxy group, a n-propoxy group, an isopropoxy group, a n-butoxy group, a sec-butoxy group, a tert-butoxy group, and a 2-ethylhexanoxy group. The alkoxy group has preferably 1 to 10 carbon atoms, more preferably 1 to 3 carbon atoms, and is further preferably a methoxy group or an ethoxy group.

At least one of $R^{31}$, $R^{32}$ and $R^{33}$ is an alkoxy group and, in order to enhance fuel cost-saving properties, preferably, at least two of $R^{31}$, $R^{32}$ and $R^{33}$ are an alkoxy group, more preferably, three of $R^{31}$, $R^{32}$ and $R^{33}$ are an alkoxy group.

In the formula (3), $A^3$ represents a substituted amino group. The substituted amino group of $A^3$ is preferably a group represented by the following formula (3-A).

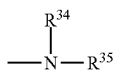

(3-A)

wherein $R^{34}$ and $R^{35}$ each represent a hydrocarbyl group, or a trihydrocarbylsilyl group, or $R^{34}$ and $R^{35}$ are bonded to represent a hydrocarbylene group optionally having a nitrogen atom and/or an oxygen atom as a hetero atom, or $R^{34}$ and $R^{35}$ are one group, and represent a group which bonds to a nitrogen atom with a double bond.

$R^{34}$ and $R^{35}$ each represent a hydrogen atom, a hydrocarbyl group optionally having a nitrogen atom and/or an oxygen atom, or $R^{34}$ and $R^{35}$ are bonded to represent a hydrocarbylene group optionally having a nitrogen atom and/or an oxygen atom, or $R^{34}$ and $R^{35}$ are one group, and represent a group which bonds to a nitrogen atom with a double bond.

Examples of the hydrocarbyl group of $R^{34}$ and $R^{35}$ include alkyl groups such as a methyl group, an ethyl group, a n-propyl group, an isopropyl group, a n-butyl group, a sec-butyl group, and a tert-butyl group; alkenyl groups such as a vinyl group, an allyl group, a 1-propenyl group, and a 1-methylethenyl group; alkynyl groups such as an ethynyl group and a propargyl group; aryl groups such as a phenyl group, a tolyl group, and a xylyl group; and aralkyl groups such as a benzyl group.

Examples of the hydrocarbyl group having a nitrogen atom of $R^{34}$ and $R^{35}$ include dialkylaminoalkyl groups such as a dimethylaminomethyl group, a dimethylaminoethyl group, a dimethylaminopropyl group, a diethylaminomethyl group, a diethylaminoethyl group, and a diethylaminopropyl group.

Examples of the hydrocarbyl group having an oxygen atom of $R^{34}$ and $R^{35}$ include alkoxyalkyl groups such as a methoxymethyl group, a methoxyethyl group, a methoxypropyl group, an ethoxymethyl group, an ethoxyethyl group, and an ethoxypropyl group; monooxacycloalkyl groups such as a 2-oxiranyl group, a 2-oxetanyl group, and a 2-tetrahydrofuranyl group; dioxacycloalkyl groups such as a 2-dioxolanyl group; alkyl groups substituted with a monooxacycloalkyl group such as a glycidyl group, and a tetrahydrofurfuryl group; and a 3,4-epoxycyclohexyl group.

Herein, the monooxacycloalkyl group represents a group in which one $CH_2$ of a cycloalkyl group is replaced with an oxygen atom. The dioxacycloalkyl group represents a group in which two $CH_2$s of a cycloalkyl group are replaced with an oxygen atom.

The number of carbon atoms of the hydrocarbyl group optionally having a nitrogen atom and/or an oxygen atom of $R^{34}$ and $R^{35}$ is preferably 1 to 10, more preferably 1 to 6.

Examples of the group in which $R^{34}$ and $R^{35}$ are bonded include a hydrocarbylene group, a hydrocarbylene group having a nitrogen atom, and a hydrocarbylene group having an oxygen atom. Examples of the hydrocarbylene group include alkylene groups such as a trimethylene group, a tetramethylene group, a pentamethylene group, and a hexamethylene group. Examples of the hydrocarbylene group having a nitrogen atom include a group represented by —$CH_2CH_2$—NH—$CH_2$—, a group represented by —$CH_2CH_2$—N=CH—, a group represented by —CH=CH—N=CH—, and a group represented by —$CH_2CH_2$—NH—$CH_2CH_2$—. Examples of the hydrocarbylene group having an oxygen atom include a group represented by —$CH_2CH_2$—O—$CH_2CH_2$—.

The group in which $R^{34}$ and $R^{35}$ are bonded has preferably 2 to 20 carbon atoms, more preferably 2 to 12 carbon atoms.

Examples of one group in which $R^{34}$ and $R^{35}$ bond to a nitrogen atom with a double bond include hydrocarbylidene groups such as an ethylidene group, a propylidene group, a butylidene group, a 1-methylethylidene, 1-methylpropylidene group, and a 1,3-dimethylbutylidene group; and a 4-N,N-dimethylaminobenzylidene group.

The one group in which $R^{34}$ and $R^{35}$ bond to a nitrogen atom with a double bond has preferably 2 to 20, more preferably 2 to 12 carbon atoms.

$R^{34}$ and $R^{35}$ are preferably a hydrocarbyl group, or a hydrocarbylene group which is a group in which $R^{34}$ and $R^{35}$ are bonded, or $R^{34}$ and $R^{35}$ are one group, and are a hydrocarbylidene group which is a group bonded to a nitrogen atom with a double bond, more preferably a hydrocarbyl group, further preferably an alkyl group. The alkyl group is preferably a methyl group or an ethyl group.

Here, p is the number of 1 to 10, preferably 2 to 4, more preferably 3.

As the compound represented by the formula (3), examples of a compound in which $R^{34}$ and $R^{35}$ are an alkyl group include:

[3-(dialkylamino)propyl]trialkoxysilanes such as
[3-(dimethylamino)propyl]trimethoxysilane,
[3-(diethylamino)propyl]trimethoxysilane,
[3-(ethylmethylamino)propyl]trimethoxysilane,
[3-(dimethylamino)propyl]triethoxysilane,
[3-(diethylamino)propyl]triethoxysilane, and
[3-(ethylmethylamino)propyl]triethoxysilane;

[3-(dialkylamino)propyl]alkyldialkoxysilanes such as
[3-(dimethylamino)propyl]methyldimethoxysilane,
[3-(diethylamino)propyl]methyldimethoxysilane,
[3-(ethylmethylamino)propyl]methyldimethoxysilane,
[3-(dimethylamino)propyl]ethyldimethoxysilane,
[3-(diethylamino)propyl]ethyldimethoxysilane,
[3-(ethylmethylamino)propyl]ethyldimethoxysilane,
[3-(dimethylamino)propyl]methyldiethoxysilane,
[3-(diethylamino)propyl]methyldiethoxysilane,
[3-(ethylmethylamino)propyl]methyldiethoxysilane,
[3-(dimethylamino)propyl]ethyldiethoxysilane,
[3-(diethylamino)propyl]ethyldiethoxysilane, and
[3-(ethylmethylamino)propyl]ethyldiethoxysilane; and

[3-(dialkylamino)propyl]dialkylalkoxysilanes such as
[3-(dimethylamino)propyl]dimethylmethoxysilane,
[3-(diethylamino)propyl]dimethylmethoxysilane,
[3-(dimethylamino)propyl]diethylmethoxysilane,
[3-(diethylamino)propyl]diethylmethoxysilane,
[3-(dimethylamino)propyl]dimethylethoxysilane,
[3-(diethylamino)propyl]dimethylethoxysilane,
[3-(dimethylamino)propyl]diethylethoxysilane, and
[3-(diethylamino)propyl]diethylethoxysilane.

As the compound represented by the formula (3), examples of a compound in which $R^{34}$ and $R^{35}$ are an alkoxyalkyl group include:
{3-[bis(alkoxyalkyl)amino]propyl}trialkoxysilanes such as
{3-[bis(methoxymethyl)amino]propyl}trimethoxysilane,
{3-[bis(ethoxymethyl)amino]propyl}trimethoxysilane,
{3-[bis(methoxyethyl)amino]propyl}trimethoxysilane,
{3-[bis(ethoxyethyl)amino]propyl}trimethoxysilane,
{3-[bis(methoxymethyl)amino]propyl}triethoxysilane,
{3-[bis(ethoxymethyl)amino]propyl}triethoxysilane,
{3-[bis(methoxyethyl)amino]propyl}triethoxysilane, and
{3-[bis(ethoxyethyl)amino]propyl}triethoxysilane;
{3-[bis(alkoxyalkyl)amino]propyl}alkyldialkoxysilanes such as
{3-[bis(methoxymethyl)amino]propyl}methyldimethoxysilane,
{3-[bis(ethoxymethyl)amino]propyl}methyldimethoxysilane, {3-[bis(methoxyethyl)amino]propyl}methyldimethoxysilane,
{3-[bis(ethoxyethyl)amino]propyl}methyldimethoxysilane,
{3-[bis(methoxymethyl)amino]propyl}ethyldimethoxysilane,
{3-[bis(ethoxymethyl)amino]propyl}ethyldimethoxysilane,
{3-[bis(methoxyethyl)amino]propyl}ethyldimethoxysilane,
{3-[bis(ethoxyethyl)amino]propyl}ethyldimethoxysilane,
{3-[bis(methoxymethyl)amino]propyl}methyldiethoxysilane,
{3-[bis(ethoxymethyl)amino]propyl}methyldiethoxysilane,
{3-[bis(methoxyethyl)amino]propyl}methyldiethyoxysilane,
{3-[bis(ethoxyethyl)amino]propyl}methyldiethoxysilane,
{3-[bis(methoxymethyl)amino]propyl}ethyldiethoxysilane,
{3-[bis(ethoxymethyl)amino]propyl}ethyldiethoxysilane,
{3-[bis(methoxyethyl)amino]propyl}ethyldiethoxysilane, and
{3-[bis(ethoxyethyl)amino]propyl}ethyldiethoxysilane; and {3-[bis(alkoxyalkyl)amino]propyl}dialkylalkoxysilanes such as
{3-[bis(methoxymethyl)amino]propyl}dimethylmethoxysilane,
{3-[bis(ethoxymethyl)amino]propyl}dimethylmethoxysilane,
{3-[bis(methoxyethyl)amino]propyl}dimethylmethoxysilane,
{3-[bis(ethoxyethyl)amino]propyl}dimethylmethoxysilane,
{3-[bis(methoxymethyl)amino]propyl}diethylmethoxysilane,
{3-[bis(ethoxymethyl)amino]propyl}diethylmethoxysilane,
{3-[bis(methoxyethyl)amino]propyl}diethylmethoxysilane,
{3-[bis(ethoxyethyl)amino]propyl}diethylmethoxysilane,
{3-[bis(methoxymethyl)amino]propyl}dimethylethoxysilane,
{3-[bis(ethoxymethyl)amino]propyl}dimethylethoxysilane,
{3-[bis(methoxyethyl)amino]propyl}dimethylethoxysilane,
{3-[bis(ethoxyethyl)amino]propyl}dimethylethoxysilane,
{3-[bis(methoxymethyl)amino]propyl}diethylethoxysilane,
{3-[bis(ethoxymethyl)amino]propyl}diethylethoxysilane,
{3-(bis(methoxyethyl)amino)propyl}diethylethoxysilane, and
{3-[bis(ethoxyethyl)amino]propyl}diethylethoxysilane.

As the compound represented by the formula (3), examples of a compound in which $R^{34}$ and $R^{35}$ are an oxiranyl group include:
{3-[di(oxiranyl)amino]propyl}trimethoxysilane,
{3-[di(oxiranyl)amino]propyl}triethoxysilane,
{3-[di(oxiranyl)amino]propyl}methyldimethoxysilane,
{3-[di(oxiranyl)amino]propyl}ethyldimethoxysilane,
{3-[di(oxiranyl)amino]propyl}methyldiethoxysilane,
{3-[di(oxiranyl)amino]propyl}ethyldiethoxysilane,
{3-[di(oxiranyl)amino]propyl}dimethylmethoxysilane,
{3-[di(oxiranyl)amino]propyl}diethylmethoxysilane,
{3-[di(oxiranyl)amino]propyl}dimethylethoxysilane, and
{3-[di(oxiranyl)amino]propyl}diethylethoxysilane.

As the compound represented by the formula (3), examples of a compound in which $R^{34}$ and $R^{35}$ are a tetrahydrofuranyl group include:
{3-[di(tetrahydrofuranyl)amino]propyl}trimethoxysilane,
{3-[di(tetrahydrofuranyl)amino]propyl}triethoxysilane,
{3-[di(tetrahydrofuranyl)amino]propyl}methyldimethoxysilane,
{3-[di(tetrahydrofuranyl)amino]propyl}ethyldimethoxysilane,
{3-[di(tetrahydrofuranyl)amino]propyl}methyldiethoxysilane,
{3-[di(tetrahydrofuranyl)amino]propyl}ethyldiethoxysilane,
{3-[di(tetrahydrofuranyl)amino]propyl}dimethylmethoxysilane,
{3-[di(tetrahydrofuranyl)amino]propyl}diethylmethoxysilane,
{3-[di(tetrahydrofuranyl)amino]propyl}dimethylethoxysilane, and
{3-[di(tetrahydrofuranyl)amino]propyl}diethylethoxysilane.

As the compound represented by the formula (3), examples of a compound in which $R^{34}$ and $R^{35}$ are a glycidyl group include:
{3-[di(glycidyl)amino]propyl}trimethoxysilane,
{3-[di(glycidyl)amino]propyl}triethoxysilane,
{3-[di(glycidyl)amino]propyl}methyldimethoxysilane,
{3-[di(glycidyl)amino]propyl}ethyldimethoxysilane,
{3-[di(glycidyl)amino]propyl}methyldiethoxysilane,
{3-[di(glycidyl)amino]propyl}ethyldiethoxysilane,
{3-[di(glycidyl)amino]propyl}dimethylmethoxysilane,
{3-[di(glycidyl)amino]propyl}diethylmethoxysilane,
{3-[di(glycidyl)amino]propyl}dimethylethoxysilane, and
{3-[di(glycidyl)amino]propyl}diethylethoxysilane.

As the compound represented by the formula (3), examples of a compound in which $R^{34}$ and $R^{35}$ are a tetrahydrofurfuryl group include:
{3-[di(tetrahydrofurfuryl)amino]propyl}trimethoxysilane,
{3-[di(tetrahydrofurfuryl)amino]propyl}triethoxysilane,
{3-[di(tetrahydrofurfuryl)amino]propyl}methyldimethoxysilane,
{3-[di(tetrahydrofurfuryl)amino]propyl}ethyldimethoxysilane,
{3-[di(tetrahydrofurfuryl)amino]propyl}methyldiethoxysilane,
{3-[di(tetrahydrofurfuryl)amino]propyl}ethyldiethoxysilane,
{3-[di(tetrahydrofurfuryl)amino]propyl}dimethylmethoxysilane,
{3-[di(tetrahydrofurfuryl)amino]propyl}diethylmethoxysilane,
{3-[di(tetrahydrofurfuryl)amino]propyl}dimethylethoxysilane, and
{3-[di(tetrahydrofurfuryl)amino]propyl}diethylethoxysilane.

As the compound represented by the formula (3), examples of a compound in which $R^{34}$ and $R^{35}$ are a bonded group include:
3-(1-piperidinyl)propyltrimethoxysilane,
3-(1-piperidinyl)propyltriethoxysilane,
3-(1-piperidinyl)propylmethyldimethoxysilane,
3-(1-piperidinyl)propylethyldimethoxysilane,
3-(1-piperidinyl)propylmethyldiethoxysilane,
3-(1-piperidinyl)propylethyldiethoxysilane,
3-(1-hexamethyleneimino)propyltrimethoxysilane,
3-(1-hexamethyleneimino)propyltriethoxysilane,
3-(1-hexamethyleneimino)propylmethyldimethoxysilane,
3-(1-hexamethyleneimino)propylethyldimethoxysilane,
3-(1-hexaxmethyleneimino)propylmethyldiethoxysilane,
3-(1-hexamethyleneimino)propylethyldiethoxysilane,
3-morpholinopropyltrimethoxysilane,
3-morpholinopropyltriethoxysilane,
3-morpholinopropylmethyldimethoxysilane,
3-morpholinopropylethyldimethoxysilane,
3-morpholinopropylmethyldiethoxysilane, and
3-morpholinopropylethyldiethoxysilane.

As the compound represented by the formula (3), examples of a compound in which $R^{34}$ and $R^{35}$ are one group which bonds to a nitrogen atom with a double bond include:
N-(1,3-dimethylbutylidene)-3-(trimethoxysilyl)-1-propaneamine, and
N-(1,3-dimethylbutylidene)-3-(triethoxysilyl)-1-propaneamine.

The compound represented by the formula (3) is more preferably [3-(dialkylamino)propyl]trialkoxysilane.

Further preferable is:
[3-(dimethylamino)propyl]trimethoxysilane,
[3-(diethylamino)propyl]trimethoxysilane,
[3-(dimethylamino)propyl]triethoxysilane, or
[3-(diethylamino)propyl]triethoxysilane.

Particularly preferable is [3-(diethylamino)propyl]trimethoxysilane.

The content of the monomer unit based on a compound represented by the formula (1) is preferably 0.01% by weight or more, more preferably 0.02% by weight or more, further preferably 0.05% by weight or more per 100% by weight of the conjugated diene-based polymer, in order to enhance fuel cost-saving properties. In order to enhance economic efficiency and increase the tensile strength at break, the content is preferably 20% by weight or less, more preferably 2% by weight or less, further preferably 1% by weigh or less.

In addition, in the monomer unit based on a compound represented by the formula (1), groups represented by $X^1$, $X^2$ and $X^3$ may have been converted into hydroxyl groups by hydrolysis, etc.

The content of the monomer unit based on a compound represented by the formula (2) is preferably 0.01% by weight or more, more preferably 0.02% by weight or more, further preferably 0.05% by weight or more per 100% by weight of the conjugated diene-based polymer, in order to enhance fuel cost-saving properties and increase tensile elongation at break. In order to enhance economic efficiency and increase the tensile strength at break, the content is preferably 20% by weight or less, more preferably 2% by weight or less, further preferably 1% by weight or less.

It is preferable that the conjugated diene-based polymer of the present invention has a constituent unit based on vinyl aromatic hydrocarbon (vinyl aromatic hydrocarbon unit) in order to enhance strength. Examples of the vinyl aromatic hydrocarbon include styrene, α-methylstyrtene, vinyltoluene, vinylnaphthalene, divinylbenzene, trivinylbenzene, and divinylnaphthalene. Preferable is styrene.

The content of the vinyl aromatic hydrocarbon unit is 0% by weight or more (the content of the conjugated diene unit is 100% by weight or less), preferably 10% by weight or more (the content of the conjugated diene unit is 90% by weight or less), more preferably 15% by weight or more (the content of the conjugated diene unit is 85% by weight or less), relative to the total amount of 100% by weight of the conjugated diene unit and the vinyl aromatic hydrocarbon unit. In order to enhance fuel cost-saving properties, the content of the vinyl aromatic hydrocarbon unit is preferably 50% by weight or less (the content of the conjugated diene unit is 50% by weight or more), more preferably 45% by weight or less (the content of the conjugated diene unit is 55% by weight or more).

The Mooney viscosity ($ML_{1+4}$) of the conjugated diene-based polymer of the present invention is preferably 10 or more, more preferably 20 or more, in order to enhance strength. In order to enhance processability, the Mooney viscosity is preferably 200 or less, more preferably 150 or less. The Mooney viscosity ($ML_{1+4}$) is measured at 100° C. according to JIS K6300 (1994).

The vinyl bonding amount of the conjugated diene-based polymer of the present invention is preferably 80 mol % or less, more preferably 70 mol % or less, relative to the content of 100 mol % of the conjugated diene unit, in order to enhance fuel cost-saving properties. In order to enhance gripping properties, the vinyl bonding amount is preferably 10 mol % or more, more preferably 15 mol % or more, further preferably 20 mol % or more, particularly preferably 40 mol % or more. The vinyl bonding amount is obtained by absorption intensity at around 910 cm$^{-1}$, which is an absorption peak of a vinyl group, using infrared spectrometry.

The molecular weight distribution of the conjugated diene-based polymer of the present invention is preferably 1 to 5, more preferably 1 to 2, in order to enhance fuel cost-saving properties. The molecular weight distribution is obtained by measuring the number average molecular weight (Mn) and the weight average molecular weight (Mw) using a gel permeation chromatography (GPC) method, and dividing Mw by Mn.

Examples of a preferable process for producing the conjugated diene-based polymer of the present invention include a production process comprising the following step A and step B.

(Step A): a step of polymerizing a monomer component comprising a conjugated diene, a compound represented by the above formula (1) and a compound represented by the above formula (2) with an alkali metal catalyst in a hydrocarbon solvent, to obtain a polymer having an alkali metal derived from the alkali metal catalyst, on at least one end of a polymer chain having a monomer unit based on the conjugated diene, a monomer unit based on a compound represented by the above formula (1) and a monomer unit based on a compound represented by the above formula (2).

(Step B): a step of reacting the polymer obtained in step A with an alkoxysilane compound.

Examples of the alkali metal catalyst used in step A include an alkali metal, an organic alkali metal compound, a complex of an alkali metal and a polar compound, and an oligomer having an alkali metal. Examples of the alkali metal include lithium, sodium, potassium, rubidium, and cesium. Examples of the organic alkali metal compound include ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium,
N-morpholinopropyllithium, lithium hexamethyleneimide, lithium pyrrolidide, lithium piperidide, lithium heptamethyleneimide, lithium dodecamethyleneimide, 1,4-dilithio-2-butene, sodium naphthalenide, sodium biphenylide, and potassium naphthalenide. In addition, examples of the complex of an alkali metal and a polar compound include a potassium-tetrahydrofuran complex, and a potassium-diethoxyethane complex, and examples of the oligomer having an alkali metal include a sodium salt of an α-methylstyrene tetramer. Preferable is an organic lithium compound or an organic sodium compound, more preferable is an organic lithium compound having 2 to 20 carbon atoms or an organic sodium compound having 2 to 20 carbon atoms.

The hydrocarbon solvent used in step A is a solvent which does not inactivate an organic alkali metal compound catalyst, and examples thereof include aliphatic hydrocarbon, aromatic hydrocarbon and alicyclic hydrocarbon.

Examples of the aliphatic hydrocarbon include propane, n-butane, iso-butane, n-pentane, iso-pentane, n-hexane, propene, 1-butene, iso-butene, trans-2-butene, cis-2-butene, 1-pentene, 2-pentene, 1-hexene, and 2-hexene. In addition, examples of the aromatic hydrocarbon include benzene, toluene, xylene, and ethylbenzene, and examples of the alicyclic hydrocarbon include cyclopentane and cyclohexane. One or more kinds thereof are used, and the hydrocarbon solvent may be a mixture of various components, such as industrial hexane. Preferable is hydrocarbon having 2 to 12 carbon atoms.

A monomer component containing a conjugated diene, a compound represented by the above formula (1) and a compound represented by the above formula (2) is polymerized with an alkali metal catalyst in a hydrocarbon solvent to produce a polymer having a monomer unit based on the conjugated diene, a monomer unit based on the compound represented by the above formula (1) and a monomer unit based on the compound represented by the above formula (2). Examples of the conjugated diene include 1,3-butadiene, isoprene, 1,3-pentadiene, 2,3-dimethyl-1,3-butadiene, and 1,3-hexadiene. One or more kinds thereof are used. Preferable is 1,3-butadiene or isoprene.

The amount of the compound represented by the formula (1) used is preferably 0.01% by weight or more, more preferably 0.02% by weight or more, further preferably 0.05% by weight or more, relative to the total amount of 100% by weight of the monomer components used in the polymerization, in order to enhance fuel cost-saving properties. In order to enhance economic efficiency, and to increase tensile elongation at break, the amount used is preferably 20% by weight or less, more preferably 2% by weight or less, further preferably 1% by weight or less, particularly preferably 0.5% by weight or less.

The amount of the compound represented by the formula (2) used is preferably 0.01% by weight or more, more preferably 0.02% by weight or more, further preferably 0.05% by weight or more, relative to the total amount of 100% by weight of the monomer components used in the polymerization, in order to enhance fuel cost-saving properties, and to increase tensile elongation at break. In order to enhance economic efficiency, and to increase tensile elongation at break, the amount used is preferably 20% by weight or less, more preferably 2% by weight or less, further preferably 1% by weight or less, particularly preferably 0.5% by weight or less.

The polymerization may be performed by combining vinyl aromatic hydrocarbon with the conjugated diene, the compound represented by the formula (1) and the compound represented by the formula (2), and examples of the vinyl aromatic hydrocarbon include styrene, α-methylstyrene, vinyltoluene, vinylnaphthalene, divinylbenzene, trivinylbenzene, and divinylnaphthalene. Preferable is styrene.

The amount of the vinyl aromatic hydrocarbon used is 0% by weight or more (the amount of the conjugated diene used is 100% by weight or less), and in order to enhance strength, the amount is preferably 10% by weight or more (the amount of the conjugated diene used is 90% by weight or less), more preferably 15% by weight or more (the amount of the conjugated diene used is 85% by weight or less), relative to the total amount of 100% by weight of the conjugated diene and the vinyl aromatic hydrocarbon used. In order to enhance fuel cost-saving properties, the amount of the vinyl aromatic hydrocarbon used is preferably 50% by weight or less (the amount of the conjugated diene used is 50% by weight or more), more preferably 45% by weight or less (the amount of the conjugated diene used is 55% by weight or more).

In addition, the total amount of the conjugated diene, the compound represented by the formula (1), the compound represented by the formula (2) and the vinyl aromatic hydrocarbon used in the polymerization reaction is preferably 99.9% by weight or more, more preferably 99.95% by weight or more, further preferably 100% by weight, relative to the total amount of 100% by weight of the monomers used, in order to enhance strength.

The polymerization reaction may be performed in the presence of an agent which adjusts the vinyl bonding amount of the conjugated diene unit, or an agent which adjusts the distribution of the conjugated diene unit and a monomer unit based on monomers other than the conjugated diene in the conjugated diene-based polymer chain (hereinafter, collectively referred to as "adjusting agent"). Examples of such agents include an ether compound, a tertiary amine, and a phosphine compound. Examples of the ether compound include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. Examples of the tertiary amine include triethylamine, tripropylamine, tributylamine, N,N,N'-N'-tetramethylethylenediamine, N,N-diethylaniline, pyridine, and quinoline. In addition, examples of the phosphine compound include trimethylphosphine, triethylphosphine, and triphenylphosphine. One or more kinds thereof are used.

The polymerization temperature in step A is usually 25 to 100° C., preferably 35 to 90° C. Further preferably 50 to 80° C. The polymerization time is usually 10 minutes to 5 hours.

In step B, the amount of the alkoxysilane compound to be reacted with the polymer prepared in step A is usually 0.1 to 3 mol, preferably 0.5 to 2 mol, more preferably 0.7 to 1.5 mol per 1 mol of an alkali metal derived from an organic alkali metal catalyst.

In the production process of the present invention, if necessary, from the polymerization initiation to polymerization termination of the monomer with an alkali metal catalyst, a coupling agent may be added to a hydrocarbon solution of the conjugated diene-based polymer. Examples of the coupling agent include a compound represented by the following formula (4).

$$R^{41}_a ML_{4-a} \tag{4}$$

wherein $R^{41}$ represents an alkyl group, an alkenyl group, a cycloalkenyl group or an aryl group, M represents a silicon atom or a tin atom, L represents a halogen atom or a hydrocarbyloxy group, and a represents an integer of 0 to 2.

Examples of the coupling agent represented by the formula (4) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

The amount of the coupling agent added is preferably 0.03 mol or more, more preferably 0.05 mol or more per 1 mol of an alkali metal derived from an alkali metal catalyst, in order to enhance the processability of the conjugated diene-based polymer. In order to enhance fuel cost-saving properties, the amount is preferably 0.4 mol or less, more preferably 0.3 mol or less.

The conjugated diene-based polymer can be recovered from a hydrocarbon solution of the conjugated diene-based polymer by a publicly known recovery method, for example, (1) a method of adding a coagulating agent to the hydrocarbon solution of the conjugated diene-based polymer, or (2) a method of adding steam to the hydrocarbon solution of the conjugated diene-based polymer. The recovered conjugated diene-based polymer may be dried with a publicly known dryer such as a band dryer or an extrusion-type dryer.

The conjugated diene-based polymer of the present invention can be incorporated into other polymer components, additives, etc., and used as a conjugated diene-polymer composition.

Examples of the other polymer components include conventional styrene-butadiene copolymer rubber, polybutadiene rubber, butadiene-isoprene copolymer rubber, and butyl rubber. In addition, examples thereof include natural rubber, an ethylene-propylene copolymer and an ethylene-octene copolymer. One or more kinds of these polymer components are used.

When the other polymer components are incorporated into the conjugated diene-based polymer of the present invention, the amount of the conjugated diene-based polymer of the present invention incorporated is preferably 10% by weight or more, more preferably 20% by weight or more, relative to the total amount of 100% by weight of the polymer components (including the amount of the conjugated diene-based polymer incorporated) incorporated, in order to enhance fuel cost-saving properties.

As the additives, publicly known additives can be used, and examples thereof include vulcanizing agents such as sulfur; vulcanization accelerators such as a thiazole-based vulcanization accelerator, a thiuram-based vulcanization accelerator, a sulfenamide-based vulcanization accelerator, and a guanidine-based vulcanization accelerator; vulcanization activating agents such as stearic acid and zinc oxide; organic peroxides such as dicumyl peroxide and ditertiary butyl peroxide; reinforcing agents such as silica and carbon black; fillers such as calcium carbonate, talc, alumina, clay, aluminum hydroxide, and mica; silane coupling agents; extender oils; processing aids; anti-aging agents; and lubricants.

Examples of the sulfur include powdery sulfur, precipitated sulfur, colloidal sulfur, insoluble sulfur and high dispersing sulfur. The amount of the sulfur incorporated is preferably 0.1 to 15 parts by weight, more preferably 0.3 to 10 parts by weight, further preferably 0.5 to 5 parts by weight per 100 parts by weight of the polymer component.

Examples of the vulcanization accelerator include thiazole-based vulcanization accelerators such as 2-mercaptobenzothiazole, dibenzothiazyl disulfide, and N-cyclohexyl-2-benzothiazyl sulfenamide; thiuram-based vulcanization accelerators such as tetramethylthiuram monosulfide and tetramethylthiuram disulfide; sulfenamide-based vulcanization accelerators such as N-cyclohexyl-2-benzothiazole sulfenamide, N-t-butyl-2-benzothiazole sulfenamide, N-oxyethylene-2-benzothiazole sulfenamide, N-oxyethylene-2-benzothiazole sulfenamide, and N,N'-diisopropyl-2-benzothiazole sulfenamide; and guanidine-based vulcanization accelerators such as diphenylguanidine, diorthotolylguanidine, and orthotolylbiguanidine. The amount of the vulcanization accelerator incorporated is preferably 0.1 to 5 parts by weight, more preferably 0.2 to 3 parts by weight per 100 parts by weight of the polymer component.

Examples of the silica include dry silica (anhydrous silicic acid), wet silica (hydrous silicic acid), colloidal silica, precipitated silica, calcium silicate, and aluminum silicate. One or more kinds thereof can be used. The BET specific surface area of the silica is preferably 50 to 250 m$^2$/g. The BET specific surface area is measured according to ASTM D1993-03. As commercially available products, trade name Ultrasil® VN3-G manufactured by Degussa, trade name VN3®, AQ, ER, RS-150 manufactured by Tosoh Silica Corporation, trade name Zeosil® 1115MP, 1165MP manufactured by Rhodia, etc., can be used.

Examples of the carbon black include furnace black, acetylene black, thermal black, channel black, and graphite. Examples of the carbon black include channel carbon black such as EPC, MPC and CC; furnace carbon black such as SAF, ISAF, HAF, MAF, FEF, SRF, GPF, APF, FF, CF, SCF and ECF; thermal carbon black such as FT and MT; and acetylene carbon black. One or more kinds thereof can be used.

The nitrogen adsorption specific surface area (N$_2$SA) of carbon black is preferably 5 to 200 m$^2$/g, and the dibutyl phthalate (DBP) absorption amount of carbon black is preferably 5 to 300 ml/100 g. The nitrogen adsorption specific surface area is measured according to ASTM D4820-93, and the DBP absorption amount is measured according to ASTM D2414-93. As commercially available products, trade name Dia Black® N339 manufactured by Mitsubishi Chemical Corporation, trade name Seast® 6, Seast® 7HM, Seast® KH manufactured by Tokai Carbon Co., Ltd., trade name CK® 3, Special Black® 4A manufactured by Degussa, etc., can be used.

When a conjugated diene-based polymer composition in which a reinforcing agent is incorporated into the conjugated diene-based polymer of the present invention is used, the amount of the reinforcing agent incorporated is preferably 10 to 150 parts by weight per 100 parts by weight of the amount of the conjugated diene-based polymer of the present invention incorporated. In order to enhance abrasion resistance and strength, the amount incorporated is more preferably 20 parts by weight or more, further preferably 30 parts by weight or more. In order to enhance reinforcing properties, the amount is more preferably 120 parts by weight or less, further preferably 100 parts by weight or less.

When the conjugated diene-based polymer composition in which a reinforcing agent is incorporated into the conjugated diene-based polymer of the present invention is used, in order to enhance fuel cost-saving properties, it is preferable that silica is used as the reinforcing agent. The amount of the silica incorporated is preferably 50 parts by weight or more, more preferably 70 parts by weight or more, relative to the total amount of 100 parts by weight of the reinforcing agent incorporated.

In addition, it is preferable that the weight ratio of the content of the silica used as the reinforcing agent to the content of carbon black (content of silica:content of carbon black) is 2:1 to 50:1. It is more preferable that the weight ratio is 5:1 to 20:1 in order to enhance fuel cost-saving properties and to enhance reinforcing properties.

Examples of the silane coupling agent include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl)tetrasulfide, γ-trimethoxysilylpropyldimethylthiocarbamyl tetrasulfide, and γ-trimethoxysilylpropylbenzothiazyl tetrasulfide. One or more kinds thereof are used. As commercially available products, trade name Si69®, Si75® manufactured by Degussa, etc., can be used.

When a conjugated diene-based polymer composition in which a silane coupling agent is incorporated into the conjugated diene-based polymer of the present invention is used, the amount of the silane coupling agent incorporated is preferably 1 to 20 parts by weight, more preferably 2 to 15 parts by weight, further preferably 5 to 10 parts by weight per 100 parts by weight of the silica.

Examples of the extender oils include an aromatic mineral oil (viscosity specific gravity constant (V.G.C. value) 0.900 to 1.049), a naphthene mineral oil (V.G.C. value 0.850 to 0.899), and a paraffin mineral oil (V.G.C. value 0.790 to 0.849). The polycyclic aromatic content of the extender oils is preferably less than 3% by weight, more preferably less than 1% by weight. The polycyclic aromatic content is measured according to the United Kingdom Petroleum Industry Association 346/92 method. In addition, the content of aromatic compound (CA) of the extender oils is preferably 20% by weight or more. One or more kinds of these extender oils are used.

As a method of incorporating the other polymer components or additives into the conjugated diene-based polymer of the present invention to produce a conjugated diene-based polymer composition, a publicly known method, for example, a method of kneading each component with a publicly known mixer such as a roll mixer or Bambury mixer can be used.

As kneading conditions, when additives other than the vulcanizing agent and the vulcanization accelerator are incorporated, the kneading temperature is usually 50 to 200° C., preferably 80 to 190° C., and the kneading time is usually 30 seconds to 30 minutes, preferably 1 minute to 30 minutes. When the vulcanizing agent and the vulcanization accelerator are incorporated, the kneading temperature is usually 100° C. or lower, preferably room temperature to 80° C. In addition, a composition in which the vulcanizing agent and the vulcanization accelerator are incorporated is usually subjected to vulcanization treatment such as press vulcanization for use. The vulcanization temperature is usually 120 to 200° C., preferably 140 to 180° C.

The conjugated diene-based polymer composition of the present invention is excellent in fuel cost-saving properties.

The conjugated diene-based polymer and conjugated diene-based polymer composition of the present invention are used in tires, soles, floor materials, and vibration prevention materials and, particularly, are suitably used in tires.

EXAMPLES

The present invention will be described below by way of Examples.

The evaluation of physical properties was performed by the following methods.

1. Mooney Viscosity ($ML_{1+4}$)

The Mooney viscosity of a polymer was measured at 100° C. according to JIS K6300 (1994).

2. Vinyl Bonding Amount (Unit: mol %)

The vinyl bonding amount of a polymer was obtained by absorption intensity at around 910 $cm^{-1}$, which is an absorption peak of a vinyl group, using infrared spectrometry.

3. Content of Styrene Unit (Unit: wt %)

The content of a styrene unit of a polymer was obtained from a refractive index according to JIS K6383 (1995).

4. Molecular Weight Distribution (Mw/Mn)

The weight average molecular weight (Mw) and the number average molecular weight (Mn) were measured by a gel permeation chromatography (GPC) method under the following conditions (1) to (8), and the molecular weight distribution (Mw/Mn) of a polymer was obtained.

(1) Apparatus: HLC-8220 manufactured by Tosoh Corporation
(2) Separation column: HM-H manufactured by Tosoh Corporation (two in series)
(3) Measurement temperature: 40° C.
(4) Carrier: tetrahydrofuran
(5) Flow rate: 0.6 mL/minute
(6) Injection amount: 5 μL
(7) Detector: differential refractive index
(8) Molecular weight standard: standard polystyrene 5. Fuel Cost-Saving Properties From a sheet-like vulcanization molded body, a strip-like test piece having a width of 1 mm or 2 mm and a length of 40 mm was punched out, and was subjected to a test. For measurements, loss tangent (tan δ (70° C.)) of a test piece at a temperature of 70° C. was measured with a viscoelasticity measuring apparatus (manufactured by Ueshima Seisakusho Co., Ltd.) under the conditions of a strain of 1% and a frequency of 10 Hz. As this value is smaller, fuel cost-saving properties are more excellent.

Example 1

The interior of a polymerization reactor made of stainless steel equipped with a stirring device having an internal volume of 20 L was washed, dried and replaced with dry nitrogen. Then, 2.10 kg of industrial hexane (density 680 kg/$m^3$), 608 g of 1,3-butadiene, 192 g of styrene, 58.53 g of a mixture of 3-(1-pyrrolidinyl)ethylstyrene and 4-(1-pyrrolidinyl)ethylstyrene, 6.1 ml of tetrahydrofuran, and 4.1 ml of ethylene glycol diethyl ether were placed into the polymerization reactor. Then, 2.74 g of bis(diethylamino)methylvinylsilane, and a solution of n-butyllithium in n-hexane (content of n-butyllithium 15.98 mmol) were placed into the polymerization reactor, and a polymerization reaction was initiated.

The copolymerization reaction of 1,3-butadiene, styrene, bis(diethylamino)methylvinylsilane, 3-(1-pyrrolidinyl)ethylstyrene, and 4-(1-pyrrolidinyl)ethylstyrene was performed for 3 hours at a stirring rate of 130 rpm and a temperature in the polymerization reactor of 65° C. while 1,3-butadiene and styrene were continuously supplied into the polymerization reactor. The amount of 1,3-butadiene supplied was 912 g, and the amount of styrene supplied was 288 g. In the total amount of monomers which were placed and supplied into the polymerization reactor, the amount of the mixture of 3-(1-pyrrolidinyl)ethylstyrene and 4-(1-pyrrolidinyl)ethylstyrene placed was 0.13% by weight, and the amount of bis(diethylamino)methylvinylsilane placed was 0.14% by weight.

Then, the resulting polymerization reaction solution was stirred at a stirring rate of 130 rpm, 12.8 mmol of [3-(diethylamino)propyl]trimethoxysilane was added to the polymer solution, and the mixture was further stirred for 15 minutes. Then, 20 ml of a hexane solution containing 0.8 ml of methanol was added to the polymer solution, and the polymer solution was further stirred for 5 minutes.

Then, to the polymer solution were added 8.0 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.), and 4.0 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer.

The evaluation results of the polymer are shown in Table 1.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name; Soxinol® D, manufacture by Sumitomo Chemical Co., Ltd), 1.5 parts by weight of a wax (trade name: Sunnoc® N, manufactured by Ouchi Shiko Chemical Industrial Co., Ltd.), and 1.4 parts by weigh of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

Example 2

The interior of a polymerization reactor made of stainless steel equipped with a stirring device having an internal volume of 20 L was washed, dried, and replaced with dry nitrogen. Then, 10.2 kg of industrial hexane (density 680 kg/m$^3$), 608 g of 1,3-butadiene, 192 g of styrene, 1.04 g of 4-dimethylaminomethylstyrene, 6.1 ml of tetrahydrofuran, and 4.0 ml of ethylene glycol diethyl ether were placed into the polymerization reactor. Then, 2.88 g of bis(diethylamino)methylvinylsilane, and a solution of n-butyllithium in n-hexane (content of n-butyllithium 17.84 mmol) were placed into the polymerization reactor, and a polymerization reaction was initiated.

The copolymerization reaction of 1,3-butadiene, styrene, and bis(diethylamino)methylvinylsilane was performed for 3 hours at a stirring rate of 130 rpm and a temperature in the polymerization reactor of 65° C. while 1,3-butadiene and styrene were continuously supplied into the polymerization reactor. The amount of 1,3-butadiene supplied was 912 g, and the amount of styrene supplied was 288 g.

In the total amount of monomers which were placed and supplied into the polymerization reactor, the amount of 4-dimethylaminomethylstyrene placed was 0.10% by weight, and the amount of bis(diethylamino)methylvinylsilane placed was 0.14% by weight.

Then, the resulting polymerization reaction solution was stirred at a stirring rate of 130 rpm, 13.4 mmol of [3-(diethylamino)propyl]trimethoxysilane was added to the polymer solution, and the mixture was further stirred for 15 minutes. Then, 20 ml of a hexane solution containing 0.8 ml of methanol was added to the polymer solution, and the polymer solution was further stirred for 5 minutes.

Then, to the polymer solution were added 8.0 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.), and 4.0 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer.

The evaluation results of the polymer are shown in Table 1.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name; Soxinol® D, manufacture by Sumitomo Chemical Co., Ltd), 1.5 parts by weight of a wax (trade name: Sunnoc® N, manufactured by Ouchi Shiko Chemical Industrial Co., Ltd.), and 1.4 parts by weigh of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

Comparative Example 1

A polymerization reactor made of stainless steel equipped with a stirring device having an internal volume of 20 L was washed, dried and replaced with dry nitrogen. Then, 10.2 kg of industrial hexane (density 680 kg/m$^3$), 547 g of 1,3-butadiene, 173 g of styrene, 6.1 ml of tetrahydrofuran, and 4.0 ml of ethylene glycol diethyl ether were placed into the polymerization reactor. Then, 15.38 mmol of n-butyllithium was placed as a n-hexane solution into the polymerization reactor, and a polymerization reaction was initiated.

A copolymerization reaction of 1,3-butadiene and styrene was performed for 3 hours at a stirring rate of 130 rpm and a temperature in the polymerization reactor of 65° C. while 1,3-butadiene and styrene were continuously supplied into the polymerization reactor. The amount of 1,3-butadiene supplied was 821 g, and the amount of styrene supplied was 259 g.

Then, the resulting polymer solution was stirred at a stirring rate of 130 rpm, 12.80 mmol of [3-(diethylamino)propyl]trimethoxysilane was added, and the mixture was stirred for 15 minutes. To the polymer solution was added 20 ml of a hexane solution containing 0.8 ml of methanol, and the polymer solution was further stirred for 5 minutes.

Then, to the polymer solution were added 8.0 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.), and 4.0 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer.

The evaluation results of the polymer are shown in Table 2.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 2.

Comparative Example 2

A polymerization reactor made of stainless steel equipped with a stirring device having an internal volume of 20 L was washed, dried and replaced with dry nitrogen. Then, 10.2 kg of industrial hexane (density 680 kg/m$^3$), 608 g of 1,3-butadiene, 192 g of styrene, 6.1 ml of tetrahydrofuran, and 4.4 ml of ethylene glycol diethyl ether were placed into the polymerization reactor. Then, 2.63 g of bis(diethylamino)methylvinylsilane, and a solution of n-butyllithium in n-hexane (content of n-butyllithium 14.68 mmol) were placed into the polymerization reactor, and a polymerization reaction was initiated.

The copolymerization reaction of 1,3-butadiene, styrene, and bis(diethylamino)methylvinylsilane was performed for 3 hours at a stirring rate of 130 rpm and a temperature in the polymerization reactor of 65° C. while 1,3-butadiene and styrene were continuously supplied into the polymerization reactor. The amount of 1,3-butadiene supplied was 912 g, and the amount of styrene supplied was 288 g. In the total amount of monomers which were placed and supplied into the polymerization reactor, the amount of bis(diethylamino)methylvinylsilane placed was 0.13% by weight.

To the polymer solution was added 20 ml of a hexane solution containing 0.8 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.), and 4.0 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 2.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxino®l D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 2.

Comparative Example 3

The interior of a polymerization reactor made of stainless steel equipped with a stirring device having an internal volume of 5 L was washed, dried, and replaced with dry nitrogen. Then, 2.55 kg of industrial hexane (density 680 kg/m$^3$), 137 g of 1,3-butadiene, 43 g of styrene, 0.53 g of a mixture of 3-(1-pyrrolidinyl)ethylstyrene and 4-(1-pyrrolidinyl)ethylstyrene, 1.52 ml of tetrahydrofuran, and 1.18 ml of ethylene glycol diethyl ether were placed into the polymerization reactor. Then, 3.73 mmol of n-butyllithium was placed as a n-hexane solution into the polymerization reactor, and a polymerization reaction was initiated.

The copolymerization reaction of 1,3-butadiene, styrene, 3-(1-pyrrolidinyl)ethylstyrene, and 4-(1-pyrrolidinyl)ethylstyrene was performed for 2 hours at a stirring rate of 130 rpm and a temperature in the polymerization reactor of 65° C. while 1,3-butadiene and styrene were continuously supplied into the polymerization reactor. The amount of 1,3-butadiene supplied was 205 g, and the amount of styrene supplied was 65 g. In the total amount of monomers which were placed and supplied into the polymerization reactor, the amount of the mixture of 3-(1-pyrrolidinyl)ethylstyrene and 4-(1-pyrrolidinyl)ethylstyrene placed was 0.12% by weight.

To the polymer solution was added 20 ml of a hexane solution containing 0.8 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.), and 4.0 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 2.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 2.

Comparative Example 4

A polymerization reactor made of stainless steel equipped with a stirring device having an internal volume of 20 L was washed, dried, and replaced with dry nitrogen. Then, 10.2 kg of industrial hexane (density 680 kg/m³), 608 g of 1,3-butadiene, 192 g of styrene, 1.04 g of 4-dimethylaminomethylstyrene, 6.1 ml of tetrahydrofuran, and 4.0 ml of ethylene glycol diethyl ether were placed into the polymerization reactor. Then, 18.52 mmol of n-butyllithium was placed as a n-hexane solution into the polymerization reactor, and a polymerization reaction was initiated.

The copolymerization reaction of 1,3-butadiene, styrene and 4-dimethylaminomethylstyrene was performed for 3 hours at a stirring rate of 130 rpm and a temperature in the polymerization reactor of 65° C. while 1,3-butadiene and styrene were continuously supplied into the polymerization reactor. The amount of 1,3-butadiene supplied was 912 g, and the amount of styrene supplied was 288 g. In the total amount of monomers which were placed and supplied into the polymerization reactor, the amount of 4-dimethylaminomethylstyrene placed was 0.10% by weight.

To the polymer solution was added 20 ml of a hexane solution containing 0.8 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.), and 4.0 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 2.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 2.

TABLE 1

|  |  | Example 1 | Example 2 |
|---|---|---|---|
| Mooney viscosity |  | 52.3 | 46.8 |
| Vinyl binding amount | mol % | 56.5 | 56.7 |
| Content of styrene unit | wt % | 24.6 | 24.5 |
| Molecular weight distribution |  | 1.23 | 1.19 |
| Fuel cost-saving properties tanδ (70° C.) |  | 0.123 | 0.120 |

TABLE 2

|  |  | Comparative Example 1 | Comparative Example 2 | Comparative Example 3 | Comparative Example 4 |
|---|---|---|---|---|---|
| Mooney viscosity |  | 49.4 | 40.9 | 40.7 | 35.9 |
| Vinyl binding amount | mol % | 57.6 | 57.6 | 58.5 | 57.1 |
| Content of styrene unit | wt % | 24.8 | 24.4 | 23.9 | 24.7 |
| Molecular weight distribution |  | 1.17 | 1.09 | 1.09 | 1.13 |
| Fuel cost-saving properties tanδ (70° C.) |  | 0.135 | 0.141 | 0.199 | 0.212 |

What is claimed is:

1. A conjugated diene-based polymer obtained by reacting one end of a polymer having a monomer unit based on a conjugated diene, a monomer unit based on a compound represented by the following formula (1), and a monomer unit based on a compound represented by the following formula (2) with an alkoxysilane compound;

$$V^1-S^1 \tag{1}$$

wherein $V^1$ represents a hydrocarbyl group having a polymerizable carbon-carbon double bond, and $S^1$ represents a substituted silyl group;

$$V^2-A^2 \tag{2}$$

wherein $V^2$ represents a hydrocarbyl group having a polymerizable carbon-carbon double bond, and $A^2$ represents a substituted amino group, or a nitrogen-containing heterocyclic group.

2. The conjugated diene-based polymer according to claim 1, wherein the alkoxysilane compound is a compound represented by the following formula (3);

$$R^{32}-\underset{\underset{R^{33}}{|}}{\overset{\overset{R^{31}}{|}}{Si}}-(CH_2)_p-A^3 \tag{3}$$

wherein p represents an integer of 1 to 10, $R^{31}$, $R^{32}$ and $R^{33}$ each represent independently an alkyl group or an alkoxy group, at least one of $R^{31}$, $R^{32}$ and $R^{33}$ is an alkoxy group, and $A^3$ represents a substituted amino group.

3. The conjugated diene-based polymer according to claim 1, wherein a group represented by $V^1$ in the formula (1) is a group represented by the following formula (1-V1), and a group represented by $S^1$ in the formula (1) is a group represented by the following formula (1-S);

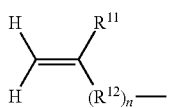
(1-V1)

wherein $R^{11}$ represents a hydrogen atom or a hydrocarbyl group, n is 0 or 1, and $R^{12}$ is a hydrocarbylene group;

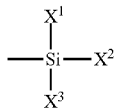
(1-S)

wherein $X^1$, $X^2$ and $X^3$ each represent independently a substituted amino group, or a hydrocarbyl group optionally having a substituent, wherein at least one of $X^1$, $X^2$ and $X^3$ is a substituted amino group.

4. The conjugated diene-based polymer according to claim 3, wherein $R^{11}$ in the formula (1-V1) is a hydrogen atom, and n in the formula (1-V1) is 0.

5. The conjugated diene-based polymer according to claim 1, wherein a group represented by $V^2$ in the formula (2) is a group represented by the following formula (2-V1);

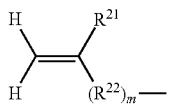
(2-V1)

wherein $R^{21}$ represents a hydrogen atom or a hydrocarbyl group, m is 0 or 1, and $R^{22}$ represents a hydrocarbylene group.

6. The conjugated diene-based polymer according to claim 1, wherein the substituted amino group of $A^2$ is a group represented by the following formula (2-A);

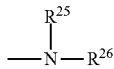
(2-A)

wherein $R^{25}$ and $R^{26}$ each represent a hydrocarbyl group, or a trihydrocarbylsilyl group, or $R^{25}$ and $R^{26}$ are bonded to represent a hydrocarbylene group optionally having a nitrogen atom and/or an oxygen atom as a hetero atom, or $R^{25}$ and $R^{26}$ are one group, and represent a group which bonds to a nitrogen atom with a double bond.

7. The conjugated diene-based polymer according to claim 1, wherein the vinyl bonding amount of the conjugated diene-based polymer is 20 mol % or more and 70 mol % or less, relative to the content of 100 mol % of a monomer unit based on a conjugated diene.

8. A conjugated diene-based polymer composition comprising the conjugated diene-based polymer according to claim 1 and a reinforcing agent, wherein the content of the reinforcing agent is 10 to 150 parts by weight per 100 parts by weight of the conjugated diene-based polymer.

9. The conjugated diene-based polymer composition according to claim 8, wherein the composition comprises silica and carbon black as the reinforcing agent, and the weight ratio of the content of silica to the content of carbon black (content of silica: content of carbon black) is 2:1 to 50:1.

10. A process for producing a conjugated diene-based polymer comprising the following step A and step B:

(Step A): a step of polymerizing a monomer component comprising a conjugated diene, a compound represented by the following formula (1) and a compound represented by the following formula (2) with an alkali metal catalyst in a hydrocarbon solvent to obtain a polymer having an alkali metal derived from the alkali metal catalyst on one end of a polymer chain having a monomer unit based on the conjugated diene, a monomer unit based on a compound represented by the following formula (1) and a monomer unit based on a compound represented by the following formula (2);

(1)

wherein $V^1$ represents a hydrocarbyl group having a polymerizable carbon-carbon double bond, and $S^1$ represents a substituted silyl group;

(2)

wherein $V^2$ represents a hydrocarbyl group having a polymerizable carbon-carbon double bond, and $A^2$ represents a substituted amino group, or a nitrogen-containing heterocyclic group;

(Step B): a step of reacting the polymer obtained in step A with an alkoxysilane compound.

11. The process for producing a conjugated diene-based polymer according to claim 10, wherein the alkoxysilane compound of step B is a compound represented by the following formula (3);

(3)

wherein p represents an integer of 1 to 10, $R^{31}$, $R^{32}$ and $R^{33}$ each represent independently an alkyl group or an alkoxy group, at least one of $R^{31}$, $R^{32}$ and $R^{33}$ is an alkoxy group, and $A^3$ represents a substituted amino group.

12. The process for producing a conjugated diene-based polymer according to claim 10, wherein a group represented by $V^1$ in the formula (1) is a group represented by the following formula (1-V1), and a group represented by $S^1$ in the formula (1) is a group represented by the following formula (1-S);

(1-V1)

wherein $R^{11}$ represents a hydrogen atom or a hydrocarbyl group, n is 0 or 1, and $R^{12}$ represents a hydrocarbylene group;

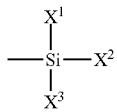

(1-S)

wherein $X^1$, $X^2$ and $X^3$ each represent independently a substituted amino group, or a hydrocarbyl group optionally having a substituent, wherein at least one of $X^1$, $X^2$ and $X^3$ is a substituted amino group.

13. The process for producing a conjugated diene-based polymer according to claim 12, wherein $R^{11}$ in the formula (1-V1) is a hydrogen atom, and n in the formula (1-V1) is 0.

14. The process for producing a conjugated diene-based polymer according to claim 10, wherein a group represented by $V^2$ in the formula (2) is a group represented by the following formula (2-V1);

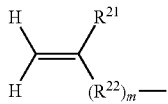

(2-V1)

wherein $R^{21}$ represents a hydrogen atom or a hydrocarbyl group, m is 0 or 1, and $R^{22}$ represents a hydrocarbylene group.

15. The process for producing a conjugated diene-based polymer according to claim 10, wherein the substituted amino group of $A^2$ is a group represented by the following formula (2-A);

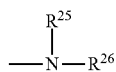

(2-A)

wherein $R^{25}$ and $R^{26}$ each represent a hydrocarbyl group, or a trihydrocarbylsilyl group, or $R^{25}$ and $R^{26}$ are bonded to represent a hydrocarbylene group optionally having a nitrogen atom and/or an oxygen atom as a hetero atom, or $R^{25}$ and $R^{26}$ are one group, and represent a group which bonds to a nitrogen atom with a double bond.

\* \* \* \* \*

UNITED STATES PATENT AND TRADEMARK OFFICE
CERTIFICATE OF CORRECTION

| | |
|---|---|
| PATENT NO. | : 8,299,179 B2 |
| APPLICATION NO. | : 13/206171 |
| DATED | : October 30, 2012 |
| INVENTOR(S) | : Mana Ito and Katsunari Inagaki |

It is certified that error appears in the above-identified patent and that said Letters Patent is hereby corrected as shown below:

On the Title Page:

Item (30) Foreign Application Priority Data should read:

August 11, 2010 (JP)     2010-180023

March 7, 2011 (JP)...........2011-048588

Signed and Sealed this
Twelfth Day of March, 2013

Teresa Stanek Rea
*Acting Director of the United States Patent and Trademark Office*